(12) United States Patent
Sinha

(10) Patent No.: US 9,494,704 B2
(45) Date of Patent: Nov. 15, 2016

(54) ESTIMATING FORMATION STRESSES USING SONIC DATA

(75) Inventor: Bikash K. Sinha, Cambridge, MA (US)

(73) Assignee: SCHLUMBERGER TECHNOLOGY CORPORATION, Cambridge, MA (US)

( * ) Notice: Subject to any disclaimer, the term of this patent is extended or adjusted under 35 U.S.C. 154(b) by 1497 days.

(21) Appl. No.: 12/512,562

(22) Filed: Jul. 30, 2009

(65) Prior Publication Data

US 2010/0020639 A1    Jan. 28, 2010

Related U.S. Application Data

(63) Continuation-in-part of application No. 12/179,300, filed on Jul. 24, 2008, now Pat. No. 9,086,506.

(51) Int. Cl.
*G01V 1/40* (2006.01)
*G01V 1/48* (2006.01)

(52) U.S. Cl.
CPC ...................... *G01V 1/48* (2013.01)

(58) Field of Classification Search
CPC ........................................ G01V 1/48
USPC ............................. 367/25, 31, 75
See application file for complete search history.

(56) References Cited

U.S. PATENT DOCUMENTS

| 4,813,028 | A | 3/1989 | Liu |
| 5,838,633 | A | 11/1998 | Sinha |
| 6,098,021 | A | 8/2000 | Tang et al. |
| 6,351,991 | B1 * | 3/2002 | Sinha ............... E21B 49/006 367/27 |
| 6,611,761 | B2 | 8/2003 | Sinha et al. |
| 6,904,365 | B2 | 6/2005 | Bratton et al. |
| 7,042,802 | B2 | 5/2006 | Sinha |
| 7,652,950 | B2 | 1/2010 | Sinha et al. |
| 8,004,932 | B2 * | 8/2011 | Zheng ................... G01V 1/44 367/32 |
| 8,036,829 | B2 * | 10/2011 | Gibbs ................ F04B 49/065 702/187 |
| 9,086,506 | B2 | 7/2015 | Sinha |
| 2010/0020642 | A1 | 1/2010 | Sinha |
| 2015/0260870 | A1 | 9/2015 | Sinha |

OTHER PUBLICATIONS

Desroches et al, "Applications of wireline stress measurements", SPE Reservoir Eval. & Eng. 2 (5) Oct. 1999, pp. 451-461.
Ekstrom, "Dispersion estimation from borehole acoustic arrays using a modified matrix pencil algorithm", IEEE, Proceedings of Asilomar-29, 1996, pp. 449-453.
Jaeger et al, "Further Problems in Elasticity", Fundamental of Rock Mechanics, Chapter 10, Chapman and Hall, NY, 1979, pp. 241-307.
Kirsch, G, "Die theorie der elastizitat and die bedurfnisse der festigkeitslehre", Z. Ver. Ingen, 42, 1989, pp. 797-807.
Norris et al, "Acoustoelasticity of solid/fluid composite systems", Geophysical Journal International, vol. 118, Aug. 1994, pp. 439-446.

(Continued)

*Primary Examiner* — Krystine Breier
(74) *Attorney, Agent, or Firm* — Jakub Michna

(57) ABSTRACT

Maximum and minimum horizontal stresses are estimated using radial profiles of shear moduli for a deviated borehole. Inversion enables estimation of maximum and minimum horizontal stresses using radial profiles of three shear moduli associated with an orthogonal set of axis defined by the deviated borehole azimuth from the North and the deviation of the longitudinal axis of the borehole from the vertical.

11 Claims, 12 Drawing Sheets

(56) References Cited

OTHER PUBLICATIONS

Pistre et al, "A modular wireline sonic tool for measurements of 3D (Azimuthal, Radial, and Axial) formation acoustic properties", SPWLA 46th Annual Logging Symposium, Society of Professional Well Log Analysts, Jun. 26-29, 2005, 13 pp.
Raaen et al, "Improved routine estimation of the minimum horizontal stress component from extended leak-off tests", International Journal of Rock Mechanics & Mining Sciences 43 (2006) pp. 37-48.
Sinha, Bikash, "Elastic waves in crystals under a bias", Ferroelectrics, 1982, vol. 41, pp. 61-73.
Thurston et al, "Third-order elastic constants and the velocity of small amplitude elastic waves in homogeneously stressed media", Physical Review, vol. 133, No. 6A, Mar. 1964, pp. A1604-A1610.
White et al, "The use of leak-off tests as means of predicting minimum in-situ stress", Petroleum Geoscience, vol. 8, 2002, pp. 189-193.
Thurman E. Scott Jr. et al., Acoustic Measurements of the Anisotropy of Dynamic Elastic and Poromechanics Moduli Under Three Stress/Strain Pathways, Journal of Engineering Mechanics, Sep. 2005, pp. 937-946.
Bikash K. Sinha et al., Estimation of Formation Stresses Using Radial Variation of Three Shear Modul—A Case Study From a High-Pressure and High-Temperature Reservoir in a Norwegian Continental Shelf, SPE 109842, Society of Petroleum Engineers, Annual Technical Conference and Exhibition, Anaheim, California, USA, Nov. 11-14, 2007, pp. 1-9.
Bikash K. Sinha et al., Recent Advances in Borehole Sonic Technology, 7th International Conference & Exposition on Petroleum Geophysics, 2008, pp. 163-169.
Bikash K. Sinha et al., Estimation of Formation Stresses Using Borehole Sonic Data, SPWLA 49th Annual Logging Symposium, May 25-28, 2008, pp. 1-16.
R.C.K. Wong et al., Inherent Transversely Isotropic Elastic Parameters of Over-Consolidated Shale Measured by Ultrasonic Waves and Their Comparison With Static and Acoustic in Situ Log Measurements, Nanjing Institute of Geophysical Prospecting, Jan. 30, 2008, pp. 103-117.

* cited by examiner

ESTIMATING FORMATION STRESSES USING SONIC DATA

CROSS REFERENCE TO RELATED APPLICATION

This application is a continuation-in-part of the following U.S. Patent Applications of which this application claims the benefits of priority: application Ser. No. 12/179,300, entitled "ESTIMATING FORMATION STRESSES USING RADIAL PROFILES OF THREE SHEAR MODULI," filed on Jul. 24, 2008;

FIELD OF THE INVENTION

The invention is generally related to analysis of subterranean formations, and more particularly to estimating formation stresses using sonic data in deviated, highly deviated or horizontal boreholes.

BACKGROUND OF THE INVENTION

It has been demonstrated that differences in shear moduli are related to differences in principal stresses in a homogeneously stressed rock. There are two independent difference equations relating the three shear moduli $C_{44}$, $C_{55}$, and $C_{66}$, and three unknowns—the maximum and minimum horizontal stresses, and an acoustoelastic coefficient defined in terms of two rock nonlinear constants ($C_{144}$ and $C_{155}$). Consequently, two independent equations relating four unknowns have to be solved.

To overcome these limitations, the applicability of shear moduli difference equations is generalized in the presence of known stress distributions caused by the presence of a borehole. Near-wellbore stress distributions are known from the theory of elasticity that is valid for rock stresses less than the rock yield stress. Dipole shear moduli $C_{44}$ and $C_{55}$ change as we approach near-wellbore region where the far-field stresses change to borehole cylindrical stresses. Radial and azimuthal variations of these stresses are known from the linear elasticity. Since these difference equations contain two unknown nonlinear constants $C_{144}$ and $C_{155}$, four unknowns need to be solved. However, two more difference equations can be formed that relate changes in the dipole shear moduli $C_{44}$ and $C_{55}$ at two radial positions to the corresponding changes in borehole cylindrical stresses. These borehole stresses can be expressed in terms of the three formation principal stresses. One of the equations relates the difference between $[C_{55}(r/a=far)-C_{55}(r/a=near)]$ to corresponding stresses at these two radial positions normalized by the borehole radius a. The second equation relates the difference between $[C_{44}(r/a=far)-C_{55}(r/a=near)]$ to the stresses at these two radial positions. Radial variations of shear moduli $C_{55}$ and $C_{44}$ are obtained from the dipole Shear Radial Velocity Profiling (SRVP) algorithm using the fast- and slow-dipole dispersions.

Therefore, these four equations can be solved to obtain the maximum and minimum horizontal stresses and the nonlinear constants $C_{155}$ and $C_{144}$ referred to a local reference state. Higher-order coefficients of nonlinear elasticity $C_{144}$, $C_{155}$, and $C_{456}$ are also used to calculate stress coefficients of shear velocities from an acoustoelastic model of wave propagation in prestressed materials ("Third-order constants and the velocity of small amplitude elastic waves in homogeneously stressed materials", by R. N. Thurston and K. Brugger, Physical Review, vol. A 133, pp. 1604-1610, 1964; "Elastic waves in crystals under a bias", by B. K. Sinha, Ferroelectrics, vol. 41, pp. 61-73. 1982).

Various devices are known for measuring formation characteristics based on sonic data. Mechanical disturbances are used to establish elastic waves in earth formations surrounding a borehole, and properties of the waves are measured to obtain information about the formations through which the waves have propagated. For example, compressional, shear and Stoneley wave information, such as velocity (or its reciprocal, slowness) in the formation and in the borehole can help in evaluation and production of hydrocarbon resources. One example of a sonic logging device is the Sonic Scanner® from Schlumberger. Another example is described in Pistre et al., "A modular wireline sonic tool for measurements of 3D (azimuthal, radial, and axial) formation acoustic properties, by Pistre, V., Kinoshita, T., Endo, T., Schilling, K., Pabon, J., Sinha, B., Plona, T., Ikegami, T., and Johnson, D.", Proceedings of the 46th Annual Logging Symposium, Society of Professional Well Log Analysts, Paper P, 2005. Other tools are also known. These tools may provide compressional slowness, $\Delta t_c$, shear slowness, $\Delta t_s$, and Stoneley slowness, $\Delta t_{st}$, each as a function of depth, z, where slowness is the reciprocal of velocity and corresponds to the interval transit time typically measured by sonic logging tools. An acoustic source in a fluid-filled borehole generates headwaves as well as relatively stronger borehole-guided modes. A standard sonic measurement system uses a piezoelectric source and hydrophone receivers situated inside the fluid-filled borehole. The piezoelectric source is configured as either a monopole or a dipole source. The source bandwidth typically ranges from a 0.5 to 20 kHz. A monopole source primarily generates the lowest-order axisymmetric mode, also referred to as the Stoneley mode, together with compressional and shear headwaves. In contrast, a dipole source primarily excites the lowest-order flexural borehole mode together with compressional and shear headwaves. The headwaves are caused by the coupling of the transmitted acoustic energy to plane waves in the formation that propagate along the borehole axis. An incident compressional wave in the borehole fluid produces critically refracted compressional waves in the formation. Those refracted along the borehole surface are known as compressional headwaves. The critical incidence angle $\theta_i = \sin^{-1}(V_f/V_c)$, where $V_f$ is the compressional wave speed in the borehole fluid; and $V_c$ is the compressional wave speed in the formation. As the compressional headwave travels along the interface, it radiates energy back into the fluid that can be detected by hydrophone receivers placed in the fluid-filled borehole. In fast formations, the shear headwave can be similarly excited by a compressional wave at the critical incidence angle $\theta_i = \sin^{-1}(V_f/V_s)$, where $V_s$ is the shear wave speed in the formation. It is also worth noting that headwaves are excited only when the wavelength of the incident wave is smaller than the borehole diameter so that the boundary can be effectively treated as a planar interface. In a homogeneous and isotropic model of fast formations, as above noted, compressional and shear headwaves can be generated by a monopole source placed in a fluid-filled borehole for determining the formation compressional and shear wave speeds. It is known that refracted shear headwaves cannot be detected in slow formations (where the shear wave velocity is less than the borehole-fluid compressional velocity) with receivers placed in the borehole fluid. In slow formations, formation shear velocities are obtained from the low-frequency asymptote of flexural dispersion. There are standard processing techniques for the estimation of formation shear velocities in either fast or slow formations from an array of recorded dipole waveforms.

It is known that sonic velocities in rocks change as a function of porosity, clay volume, saturation, stresses and temperature. It is, therefore, necessary to invert only those velocity differences between two depths or radial positions that are largely due to stress changes and effects of any other contributing factors are eliminated. The underlying theory behind the estimation of formation stresses using borehole sonic data is based on acoustoelastic effects in rocks. Acoustoelasticity in rocks refers to changes in elastic wave velocities caused by changes in pre-stress in the propagating medium. Elastic wave propagation in a pre-stressed material is described by equations of motion for small dynamic fields superposed on a statically deformed state of the material. These equations are derived from the rotationally invariant equations of nonlinear elasticity ("Elastic waves in crystals under a bias", by B. K. Sinha, Ferroelectrics, vol. 41, pp. 61-73. 1982; "Acoustoelasticity of solid/fluid composite systems", by A. N. Norris, B. K. Sinha, and S. Kostek, Geophysical Journal International, vol. 118, pp. 439-446, August 1994). Equations of motion for pre-stressed isotropic materials contain two linear ($\lambda$ and $\mu$) and three nonlinear elastic stiffness constants ($C_{111}$, $C_{144}$, $C_{155}$) in a chosen reference state together with the biasing stresses. A forward solution of equations of motion in pre-stressed materials yields plane wave velocities as a function of principal stresses in the propagating medium. An inversion algorithm estimates stresses in the propagating medium in terms of measured velocities.

All these techniques account for estimation of formation stresses using sonic data acquired in vertical wells, referred to an orthogonal trihedron including the vertical borehole axis. However, onshore, it is necessary to drill a deviated well to enter formations at selected locations and angles. This may occur because of the faulting in the region. It is also necessary to do this around certain types of salt structures. As a further example of onshore deviated drilling, there has been growing interest in providing surveys of wells that have been deviated from a vertical portion toward the horizontal.

In offshore production, once a producing formation has been located, it is typically produced from a centrally positioned platform. A single production platform is typically installed at a central location above the formation and supported on the ocean bottom. A production platform supports a drilling rig which is moved from place to place on the platform so that a number of wells are drilled. From the inception, most of the wells are parallel and extend downwardly with parallel portions, at least to a certain depth. Then, they are deviated at some angle. At the outer end of the deviated portion, vertical drilling may again be resumed. While a few of the wells will be more or less vertically drilled, many of the wells will be drilled with three portions, a shallow vertical portion, an angled portion, and a termination portion in the formation which is more or less vertically positioned. Therefore the need to provide formation stresses data in deviated wells is continuously increasing.

SUMMARY OF THE INVENTION

According to one embodiment of the invention, it is proposed a method for estimating maximum and minimum horizontal stresses in a formation in which a deviated borehole is present comprising determining radial profiles of Stoneley, fast dipole shear and slow dipole shear slownesses; estimating maximum and minimum horizontal stresses by inverting differences in far-field shear moduli with difference equation obtained from radial profiles of dipole shear moduli C44", C55" and deviated borehole stresses wherein said dipole shear moduli C44", C55" and deviated borehole stresses are referred to a trihedron of orthogonal axis defined by the deviated borehole azimuth from the North and the deviation of the longitudinal axis of the deviated borehole from the vertical; and producing an indication of the maximum and minimum horizontal stresses in the formation in tangible form.

Advantageously, estimating maximum and minimum horizontal stresses comprises expressing a first set of principal stresses as a function of the deviated borehole azimuth from the North, the deviation of the longitudinal axis of the deviated borehole from the vertical and the formation maximum horizontal stress, minimum horizontal stress and overburden stress.

Advantageously, expressing radial profiles of Stoneley, fast dipole shear and slow dipole shear slownesses as a function of the first set of principal stresses and an acoustoelastic coefficient.

Advantageously, the acoustoelastic coefficient comprises a non linear elastic stiffness parameter and a shear modulus of the formation.

Advantageously, the acoustoelastic coefficient relates sonic or seismic velocities in the formation to corresponding changes in the first set of principal stresses in the formation.

It is also an object of the invention to propose an apparatus for estimating stress in a formation in which a deviated borehole is present comprising: at least one acoustic sensor that provides radial profiles of Stoneley, fast dipole shear and slow dipole shear slownesses; processing circuitry that estimates maximum and minimum horizontal stresses by inverting differences in far-field shear moduli with difference equation obtained from radial profiles of dipole shear moduli C44", C55" and deviated borehole stresses, said dipole shear moduli C44", C55" and deviated borehole stresses being referred to a trihedron of orthogonal axis defined by the deviated borehole azimuth from the North and the deviation of the longitudinal axis of the deviated borehole from the vertical; and an output that produces an indication of the maximum and minimum horizontal stresses in tangible form.

It is another object of the invention to propose a method for estimating maximum horizontal stress direction from the North in a formation in which a deviated borehole is present comprising: determining radial profiles of Stoneley, fast dipole shear and slow dipole shear slownesses; obtaining minimum horizontal and formation overburden stresses from measurements taken in the deviated borehole; identify the deviated borehole azimuth from the maximum horizontal stress direction from the obtained minimum horizontal stress; determine the deviated borehole azimuth from the North; estimate the maximum horizontal stress direction from the North from the radial profiles of Stoneley, fast dipole shear and slow dipole shear slownesses, the minimum horizontal stress and the deviated borehole azimuth; and producing maximum horizontal stress direction from the North in a formation in tangible form.

In another embodiment of the invention it is proposed a method for estimating horizontal to overburden stress ratio in a formation in which a deviated borehole is present comprising: determining radial profiles of Stoneley, fast dipole shear and slow dipole shear slownesses; expressing the minimum horizontal to overburden stress ratio as a function of the maximum horizontal to overburden stress ratio; calculating a first and a second parameters comprising nonlinear elastic stiffness constants for the formation as a function of the maximum horizontal to overburden stress ratio; calculating a first estimation of an acoustoelastic coefficient as a function of the maximum horizontal to overburden stress ratio; calculating a second estimation of the acoustoelastic coefficient as a function of the fast dipole shear and slow dipole shear slownesses, maximum horizontal stress and minimum horizontal stress; expressing an error function between the first and second estimations of the acoustoelastic coefficient as a function of the maximum horizontal to overburden stress ratio; estimating a value of the maximum horizontal to overburden stress ratio when the error function is minimum; and calculating the minimum horizontal to overburden stress ratio from the value of the maximum horizontal to overburden stress ratio.

Advantageously, calculating the minimum horizontal to overburden stress ratio is based on the equation:

$$\frac{\sigma_h}{\sigma_v} = \left(\frac{B_1}{B_3}\right)\left(\frac{\sigma_H}{\sigma_V}\right) - \left(\frac{B_2}{B_3}\right),$$

where $B_1 = R_1 \sin^2\phi \sin^2\theta + R_2 \sin^2\phi \cos^2\theta + \cos^2\phi,$ $B_2 = R_1 \cos^2\theta + R_2 \sin^2\theta,$ $B_3 = R_1 \cos^2\phi \sin^2\theta + R_2 \cos^2\phi \cos^2\theta,$ $$R_1 = \frac{C_{55}'' - C_{44}''}{C_{55}'' - C_{66}''},$$

$$R_2 = \frac{C_{44}'' - C_{66}''}{C_{55}'' - C_{66}''},$$

and φ is the azimuth of the deviated borehole measured from the North, θ the deviation of the longitudinal axis of the deviated borehole from the vertical, $C_{44}''$, $C_{55}''$, $C_{66}''$ are the shear moduli referred to a trihedron of orthogonal axis defined by the deviated borehole azimuth from the North and the deviation of the longitudinal axis of the deviated borehole from the vertical.

A further object of the invention is to propose a method for estimating maximum horizontal stress magnitude in a formation in which a deviated borehole is present comprising: determining radial profiles of Stoneley, fast dipole shear and slow dipole shear slownesses; obtaining minimum horizontal stress from a mini-frac or XLOT in a nearby offset well in the same field; obtaining overburden stress from an integration of bulk density from the surface to the depth of interest; identify the deviated borehole azimuth from the maximum horizontal stress direction; determine the deviated borehole deviation from the horizontal; and estimate the maximum horizontal stress magnitude using the three far-field shear moduli from the radial profiles of the Stoneley, fast dipole shear, and slow dipole shear slownesses based on the following equations $$\sigma_H = \frac{(a_2 - R_1 a_5)}{(R_1 a_4 - a_1)}\sigma_h + \frac{(a_3 - R_1 a_6)}{(R_1 a_4 - a_1)}\sigma_V,$$

where $$R_1 = \frac{C_{55}'' - C_{44}''}{C_{55}'' - C_{66}''},$$

$a_1 = \cos^2\phi - \sin^2\phi \cos^2\theta,$

-continued $a_2 = \sin^2\phi - \cos^2\phi \cos^2\theta,$ $a_3 = -\sin^2\theta,$ $a_4 = \sin^2\phi(\sin^2\theta - \cos^2\theta),$ $a_5 = \cos^2\varphi(\sin^2\theta - \cos^2\theta),$ $a_6 = \cos^2\theta - \sin^2\theta.$

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 1:
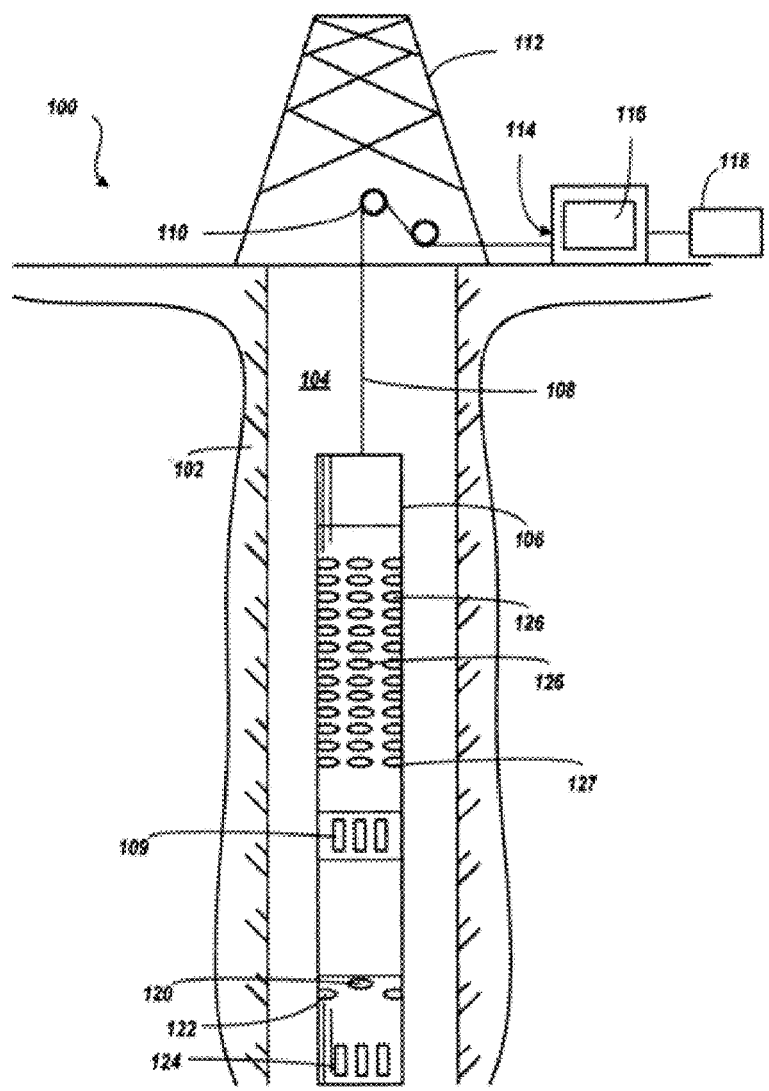
FIG. 1 illustrates one example of a logging tool used to acquire and analyse data in accordance with an embodiment of the invention.

FIG. 1 illustrates one example of a logging tool (106) used to acquire and analyze data in accordance with an embodiment of the invention. The tool has a plurality of receivers and transmitters. The illustrated logging tool (106) also includes multi-pole transmitters such as crossed dipole transmitters (120, 122) (only one end of dipole (120) is visible in FIG. 1) and monopole transmitters (109) (close) and (124) (far) capable of exciting compressional, shear, Stoneley, and flexural waves. The logging tool (106) also includes receivers (126), which are spaced apart some distance from the transmitters. Each receiver may include multiple hydrophones mounted azimuthally at regular intervals around the circumference of the tool. Other configurations, such as a Digital Sonic Imaging (DSI) tool with four receivers at each of eight receiver stations, or incorporating other multi-pole sources such as quadrupole, are also possible. The use of a plurality of receivers and transmitters results in improved signal quality and adequate extraction of the various borehole signals over a wide frequency band However, the distances, number and types of receivers and transmitters shown in this embodiment are merely one possible configuration, and should not be construed as limiting the invention.

The subsurface formation (102) is traversed by a borehole (104) which may be filled with drilling fluid or mud. The logging tool (106) is suspended from an armored cable (108) and may have optional centralizers (not shown). The cable (108) extends from the borehole (104) over a sheave wheel (110) on a derrick (112) to a winch forming part of surface equipment, which may include an analyzer unit (114). Well known depth gauging equipment (not shown) may be provided to measure cable displacement over the sheave wheel (110). The tool (106) may include any of many well known devices to produce a signal indicating tool orientation. Processing and interface circuitry within the tool (106) amplifies, samples and digitizes the tool's information signals for transmission and communicates them to the analyzer unit (114) via the cable (108). Electrical power and control signals for coordinating operation of the tool (106) may be generated by the analyzer unit (114) or some other device, and communicated via the cable (108) to circuitry provided within the tool (106). The surface equipment includes a processor subsystem (116) (which may include a microprocessor, memory, clock and timing, and input/output functions—not separately shown), standard peripheral equipment (not separately shown), and a recorder (118).

Figure 2:
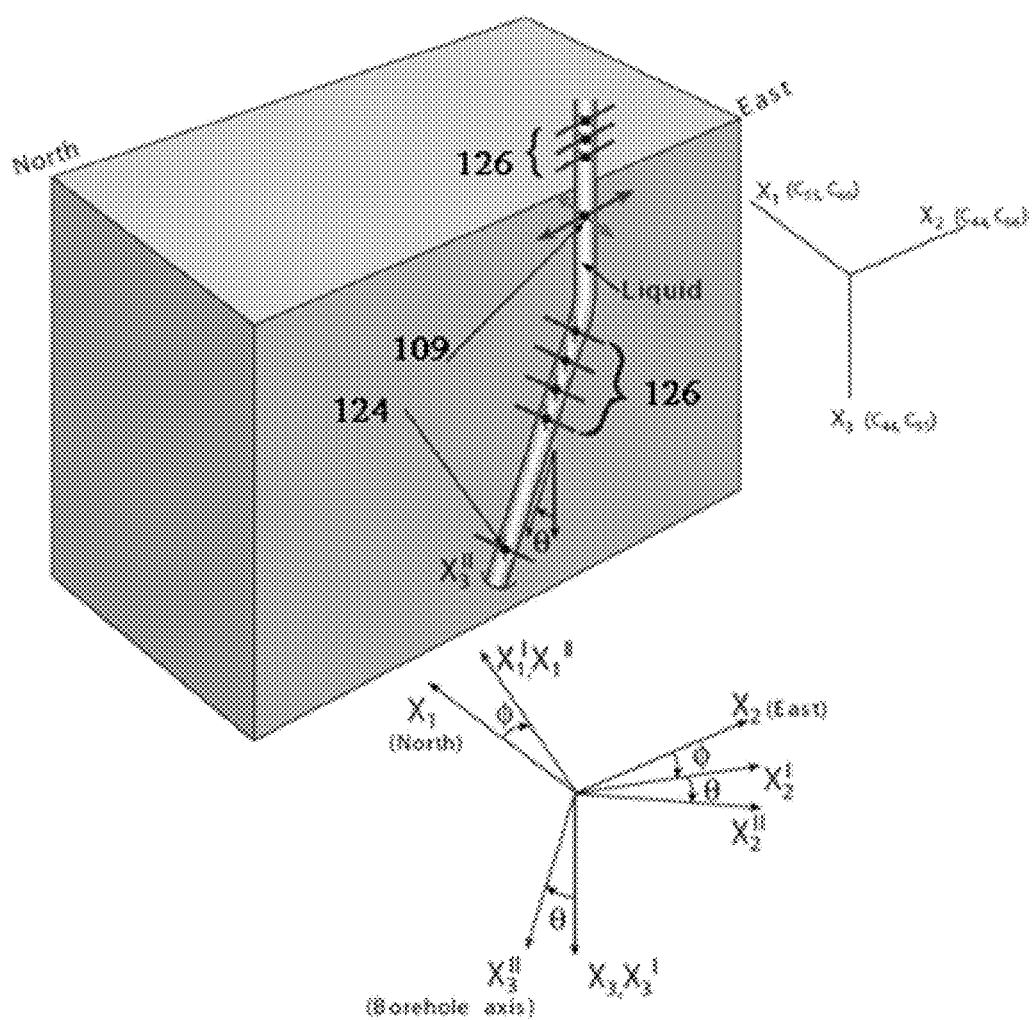
FIG. 2 is a schematic diagram of a deviated borehole with azimuth φ measure from the North and deviation θ from the vertical.
Figure 3:
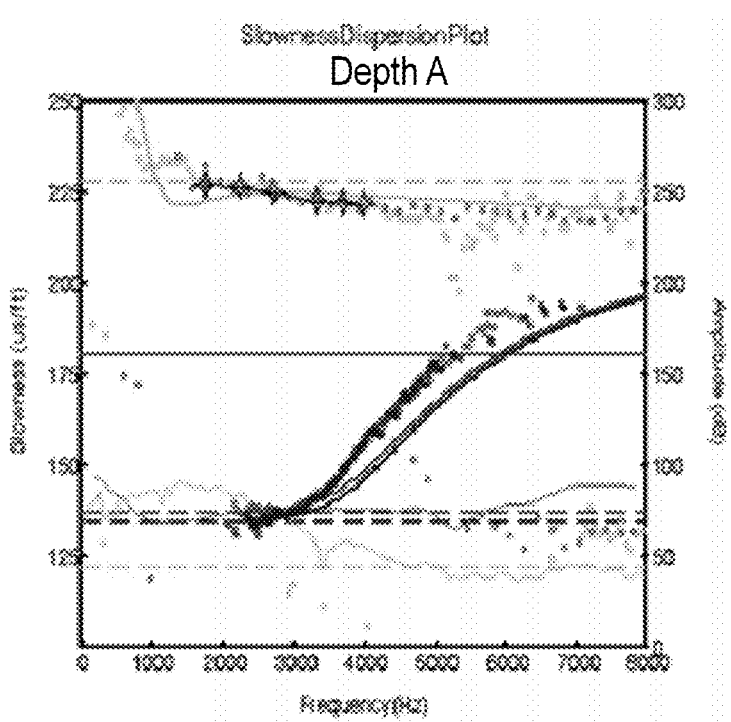
FIG. 3 is a schematic diagram of a borehole subject to triaxial stresses, together will wellbore pressure and pore pressure.

FIG. 2 shows schematic diagram of a borehole parallel to a $X''_3$-axis in a formation subject to the overburden ($S_V$) parallel to the $X_3$-axis, maximum horizontal (SHmax) parallel to the $X_1$-axis, and minimum horizontal (Shmin) stress parallel to the $X_2$-axis. The deviated borehole has an azimuth φ measured from the North and deviation θ from the vertical. In the embodiment, it is assumed that the maximum horizontal stress direction coincides with the North. Since sonic velocities change as a function of effective stresses, effective stresses can be used in all equations describing stress-induced effects on sonic velocities. FIG. 3 displays a fluid-filled borehole with a wellbore pressure Pw and a surrounding porous formation with a pore pressure Pp. The borehole is subject to triaxial stresses $T_{xx}$ ($=S_H$), $T_{yy}$ ($=S_H$), and $T_{zz}$ ($=S_V$). Effective stress $\sigma_{ij}=T_{ij}\delta_{ij} \alpha P_p$, where $T_{ij}$ is the applied stress, $\delta_{ij}$ is the Kronecker delta, and α is the Biot parameter. It is assumed that the $X_1$-, $X_2$-, and $X_3$-axis, respectively, are parallel to the effective maximum horizontal ($\sigma_H$), minimum horizontal ($\sigma_h$), and vertical ($\sigma_V$) stresses. The borehole radius is denoted by "a".

Referred to an isotropically loaded reference state, shear moduli in the three orthogonal planes are the same ($C_{44}=C_{55}=C_{66}=\mu$). When this rock is subject to anisotropic incremental stresses, changes in the shear moduli can be expressed as $$\Delta C_{55} = [C_{55} - vC_{144} + (1-v)C_{155}] \frac{\Delta\sigma_{11}}{2\mu(1+v)} + [C_{144} - (1+2v)C_{55} - 2vC_{155}]\frac{\Delta\sigma_{22}}{2\mu(1+v)} + [2\mu(1+v) + C_{55} - vC_{144} + (1-v)C_{155}]\frac{\Delta\sigma_{33}}{2\mu(1+v)}, \quad (1)$$

where $\Delta C_{55}$ is obtained from the fast-dipole shear slowness from sonic data acquired by a dipole transmitter aligned parallel to the $X_1$-direction and borehole parallel to the $X''_3$-direction; the quantities $\mu$ and $\nu$ are the linear elastic moduli, whereas $C_{144}$ and $C_{155}$ are the formation nonlinear constants in the chosen reference state; and $\Delta\sigma_{33}$, $\Delta\sigma_{11}$, and $\Delta\sigma_{22}$, respectively, denote the effective overburden (parallel to the $X''_3$-direction), maximum horizontal (parallel to the $X_1$-direction), and minimum horizontal (parallel to the $X_2$-direction) stresses at a chosen depth of interest, $$\Delta C_{44} = [-(1+2\nu)C_{44} + C_{144} - 2\nu C_{155}] \frac{\Delta\sigma_{11}}{2\mu(1+\nu)} + [-\nu C_{144} + C_{44} + (1-\nu)C_{155}] \frac{\Delta\sigma_{22}}{2\mu(1+\nu)} + [2\mu(1+\nu) + C_{44} - \nu C_{144} + (1-\nu)C_{155}] \frac{\Delta\sigma_{33}}{2\mu(1+\nu)}, \quad (2)$$

where $\Delta C_{44}$ is obtained from the slow-dipole shear slowness from sonic data acquired by a dipole transmitter aligned parallel to the $X''_2$-direction and borehole parallel to the $X''_3$-direction.

$$\Delta C_{66} = [\mu(1+\nu)C_{66} - \nu C_{144} + (1-\nu)C_{155}] \frac{(\Delta\sigma_{11}+\Delta\sigma_{22})}{2\mu(1+\nu)} + [-(1+2\nu)C_{66} + C_{144} - 2\nu C_{155}] \frac{\Delta\sigma_{33}}{2\mu(1+\nu)}, \quad (3)$$

where $\Delta C_{66}$ is obtained from the Stoneley shear slowness dispersion from sonic data acquired by a monopole transmitter at a chosen depth of interest.

Rotation of Formation Principal Stresses to Deviated Borehole Axis.

According to one embodiment of the invention, in order to obtain formation principal stresses in the deviated boreholes, sonic data acquired in the trihedron of orthogonal axis including the deviated borehole axis $X''_3$ will be rotated to a trihedron of orthogonal axis including the vertical axis $X_3$ as shown on FIG. 2. Therefore it is considered a deviated wellbore with an azimuth $\phi$ measured from the $X_1$ axis obtained by rotating the trihedron $(X_1, X_2, X_3)$ about the $X_3$-axis, and a deviation of $\theta$ from the vertical obtained by rotating the trihedron $(X_1', X_2', X_3')$ about the $X_1'$ axis in order to obtain a final trihedron $(X_1'', X_2'', X_3'')$. FIG. 2 shows schematic diagram of a wellbore with an azimuth $\phi$ measured from the North and deviation $\theta$ from the vertical. Rotated stresses referred to the $(X_1'', X_2'', X_3'')$ trihedron can be written in terms of the principal stresses $T_{11}$, $T_{22}$ and $T_{33}$ referred the $(X_1, X_2, X_3)$ trihedron as shown below:

$T_{11}'' = T_{11} \cos^2\phi + T_{22} \sin^2\phi$, $T_{22}'' = T_{11} \sin^2\phi \cos^2\theta + T_{22} \cos^2\phi \cos^2\theta + T_{33} \sin^2\theta$, $T_{33}'' = T_{11} \sin^2\phi \sin^2\theta + T_{22} \cos^2\phi \sin^2\theta + T_{33} \cos^2\theta$, $T_{12}'' = -T_{11} \cos\phi \sin\phi \cos\theta + T_{22} \cos\phi \sin\phi \cos\theta$, $T_{13}'' = T_{11} \cos\phi \sin\phi \theta - T_{22} \cos\phi \sin\phi \sin\theta$, $T_{23}'' = -T_{11} \sin^2\phi \cos\theta \sin\theta - T_{22} \cos^2\phi \cos\theta \sin\theta + T_{33} \cos\theta \sin\theta$. \quad (4)

Since both the seismic and sonic wave velocities change as a function of effective prestress in the propagation medium, the borehole effective stresses $\sigma_{ij}$ can be written in terms of the formation effective stresses referred to the principal stress axis as shown below:

$\sigma_{11}'' = \sigma_H'' = \sigma_{11} \cos^2\phi + \sigma_{22} \sin^2\phi$, $\sigma_{22}'' = \sigma_h'' = \sigma_{11} \sin^2\phi \cos^2\theta + \sigma_{22} \cos^2\phi \cos^2\theta + \sigma_{33} \sin^2\theta$, $\sigma_{33}'' = \sigma_V = \sigma_{11} \sin^2\phi \sin^2\theta + \sigma_{22} \cos^2\phi \sin^2\theta + \sigma_{33} \cos^2\theta$, \quad (5)

where $\sigma_{11}$, $\sigma_{22}$, and $\sigma_{33}$ are the borehole radial, hoop, and axial stresses parallel to the $X_1$, $X_2$, and $X_3$-axis, respectively and "a" denotes the borehole radius. These borehole stresses can be expressed in terms of the far-field formation principal stresses using the Kirsch's equations:

$$\sigma_{11} = \sigma_{rr} = \frac{\sigma_+}{2}\left(1 - \frac{a^2}{r^2}\right) + \frac{\sigma_-}{2}\left(1 - \frac{4a^2}{r^2} + \frac{3a^4}{r^4}\right)\cos 2\psi + \Delta P_W \frac{a^2}{r^2}, \quad (6)$$

$$\sigma_{22} = \sigma_{\theta\theta} = \frac{\sigma_+}{2}\left(1 + \frac{a^2}{r^2}\right) - \frac{\sigma_-}{2}\left(1 + \frac{3a^4}{r^4}\right)\cos 2\psi - \Delta P_W \frac{a^2}{r^2},$$

$$\sigma_{33} = \sigma_{ZZ} = \sigma_V - \nu\sigma_- \frac{2a^2}{r^2}\cos 2\psi,$$

$$\sigma_{12} = \sigma_{r\theta} = -\frac{\sigma_-}{2}\left(1 + \frac{2a^2}{r^2} - 3\frac{a^4}{r^4}\right)\sin 2\psi,$$

$\sigma_+ = \sigma_H + \sigma_h$, $\sigma_- = \sigma_H - \sigma_h$, $\Delta P_W = P_W - P_P$, where $\psi$ is the radial stress direction measured from the far-field maximum horizontal stress $\sigma_H$ direction. $P_W$ and $P_P$ are the wellbore and pore pressures at the depth of interest.

Difference Equations Using the Far-Field Shear Moduli

It needs to be recalled that the $X_1$-, $X_2$-, and $X_3$-axis, respectively, are parallel to the maximum horizontal ($\sigma_H$), minimum horizontal ($\sigma_h$), and vertical ($\sigma_V$) stresses that define the principal stress axes. Referred to the rotated borehole trihedron $(X_1'', X_2'', X_3'')$, axis are defined by borehole azimuth $\phi$ from the North and deviation $\theta$ from the vertical. Then the difference equations can be formed in the effective shear moduli referred to the borehole axes in terms of differences in the effective stress magnitudes parallel to the rotated borehole $(X_1'', X_2'', X_3'')$ axes through an acoustoelastic coefficient defined in terms of formation nonlinear constants referred to a chosen reference state and for a given formation lithology. The following three equations relate changes in the shear moduli to corresponding changes in the effective principal stresses:

$C_{44}'' - C_{66}'' = A_E(\sigma_{33}'' - \sigma_{11}'')$, \quad (7)

$C_{55}'' - C_{66}'' = A_E(\sigma_{33}'' - \sigma_{22}'')$, \quad (8)

$C_{55}'' - C_{44}'' = A_E(\sigma_{11}'' - \sigma_{22}'')$, \quad (9)

where $\Delta\sigma''_{33}$, $\Delta\sigma''_{11}$, and $\Delta\sigma''_{22}$ denote changes in the effective overburden, maximum horizontal, and minimum horizontal stresses, respectively; and $$A_E = 2 + \frac{C_{456}}{\mu}, \quad (10)$$

is the acoustoelastic coefficient, $C_{55}''$ and $C_{44}''$ denote the shear moduli for the fast and slow shear waves in the cross-sectional plane of the rotated borehole, respectively; $C_{456} = (C_{155} - C_{144})/2$, is a formation nonlinear parameter that defines the acoustoelastic coefficient; and p represents the shear modulus in a chosen reference state. However, only two of the three difference equations (7), (8), and (9) are independent.

The presence of differential stress in the cross-sectional plane of borehole causes dipole shear wave splitting and the observed shear slowness anisotropy can be used to calculate the acoustoelastic coefficient $A_E$ from equation (10) provided we have estimates of the three principal stresses as a function of depth. Note that the dipole shear waves are largely unaffected by the fluid mobility. We can then estimate the stress-induced change in the Stoneley shear modulus $C_{66}''$ using equations (8) and (9), and the effective stress magnitudes $\Delta\sigma_V''$, $\Delta\sigma_H''$, and $\Delta\sigma_h''$ at a given depth.

Difference Equations Using Radial Profiles of Shear Moduli

In addition to the step described previsouly, we proceed to obtain two more independent equations using radial profiles of the three principal stresses together with measured radial profile of shear moduli obtained from the SRVP algorithm. When combined with the two difference equations (4) and (5) in terms of the far-field shear moduli, we obtain 4 independent equations to solve for the four unknowns—$\Delta\sigma_H$, $\Delta\sigma_h$, $C_{144}$ and $C_{155}$. To this end, we re-write equations (1), (2), and (3) in terms of the principal stress parameters $\Delta\sigma_H$, $\Delta\sigma_h$, and $\Delta\sigma_V$:

$$\Delta C_{55}^{//} = [C_{55} - \nu C_{144} + (1-\nu)C_{155}] \frac{\Delta\sigma_H^{//}}{2\mu(1+\nu)} + [C_{144} - (1+2\nu)C_{55} - 2\nu C_{155}]\frac{\Delta\sigma_h^{//}}{2\mu(1+\nu)} + \quad (11)$$
$$[2\mu(1+\nu) + C_{55} - \nu C_{144} + (1-\nu)C_{155}]\frac{\Delta\sigma_V^{//}}{2\mu(1+\nu)},$$

$$\Delta C_{44}^{//} = [-(1+2\nu)C_{44} + C_{144} - 2\nu C_{155}] \frac{\Delta\sigma_H^{//}}{2\mu(1+\nu)} + [-\nu C_{144} + C_{44} + (1-\nu)C_{155}]\frac{\Delta\sigma_h^{//}}{2\mu(1+\nu)} + \quad (12)$$
$$[2\mu(1+\nu) + C_{44} - \nu C_{144} + (1-\nu)C_{155}]\frac{\Delta\sigma_V^{//}}{2\mu(1+\nu)},$$

$$\Delta C_{66}^{//} = [\mu(1+\nu)C_{66} - \nu C_{144} + (1-\nu)C_{155}]\frac{(\Delta\sigma_H^{//} + \Delta\sigma_h^{//})}{2\mu(1+\nu)} + [-(1+2\nu)C_{66} + C_{144} - 2\nu C_{155}]\frac{\Delta\sigma_V^{//}}{2\mu(1+\nu)}, \quad (13)$$

Next we define the following non-dimensional parameters:

$$S_H^{//} = \frac{\Delta\sigma_H^{//}}{2\mu(1+\nu)}, \quad (14)$$

$$S_h^{//} = \frac{\Delta\sigma_h^{//}}{2\mu(1+\nu)},$$

$$S_V^{//} = \frac{\Delta\sigma_V^{//}}{2\mu(1+\nu)}$$

and $$A_1 = -\nu C_{144} + (1-\nu)C_{155}, \; A_2 = C_{144} - 2\nu C_{155} \quad (15)$$

$$C_{44}^{//} - C_{66}^{//} = A_E(\sigma_V^{//} - \sigma_H^{//}), \quad (16)$$

$$C_{55}^{//} - C_{66}^{//} = A_E(\sigma_V^{//} - \sigma_h^{//}). \quad (17)$$

We therefore can obtain the following expression for the stress ratio from equations (16) and (17):

$$\frac{\sigma_h^{//}}{\sigma_V^{//}} = 1 - \frac{C_{55}^{//} - C_{66}^{//}}{C_{44}^{//} - C_{66}^{//}} + \left(\frac{C_{55}^{//} - C_{66}^{//}}{C_{44}^{//} - C_{66}^{//}}\right)\frac{\sigma_H^{//}}{\sigma_V^{//}} \quad (18)$$

$$= \frac{C_{44}^{//} - C_{55}^{//}}{C_{44}^{//} - C_{66}^{//}} + \left(\frac{C_{55}^{//} - C_{66}^{//}}{C_{44}^{//} - C_{66}^{//}}\right)\frac{\sigma_H^{//}}{\sigma_V^{//}},$$

Subtracting equation (16) from (17), and substituting for $A_E$ from equation (15), we obtain:

$$C_{55}^{//} - C_{44}^{//} = [2\mu(1+\nu) + A_1 - A_2]\frac{\sigma_H^{//} - \sigma_h^{//}}{2\mu(1+\nu)} \quad (19)$$

This results in one of the two equations relating $A_1$ and $A_2$:

$$A_1 - A_2 = 2\mu(1+\nu)\left[\frac{C_{55}^{//} - C_{44}^{//}}{\sigma_H^{//} - \sigma_h^{//}} - 1\right] \quad (20)$$

On the other hand, we can obtain different $A_1$ and $A_2$ values for different $\Delta\sigma_H/\Delta\sigma_V$ as follows:

We can now re-write equation (21) referred to the rotated borehole axes. To this end, we substitute $\sigma_V''$, $\sigma_H''$, and $\sigma_h''$ from equations (5) and (6) and obtain:

$$\Delta C_{55}^{//(\theta=0)}(r/a) = \quad (21)$$

$$(\mu + A_1)\begin{bmatrix} (\xi_1^{HH}\cos^2\phi + \xi_1^{HH}\sin^2\phi)\sigma_H + \\ (\xi_2^{HH}\cos^2\phi + \xi_2^{hh}\sin^2\phi)\sigma_h + \\ (\xi_3^{HH}\cos^2\phi + \xi_3^{hh}\sin^2\phi)\Delta P_W \end{bmatrix} + [-\mu(1+2\nu) + A_2]$$

$$\begin{bmatrix} \left(\xi_1^{HH}\sin^2\phi\cos^2\theta + \xi_1^{hh}\cos^2\phi\cos^2\theta + \xi_1^{VV}\sin^2\theta\right)\sigma_H + \\ \left(\xi_2^{HH}\sin^2\phi\cos^2\theta + \xi_2^{hh}\cos^2\phi\cos^2\theta + \xi_2^{VV}\sin^2\theta\right)\sigma_h + \\ (\sin^2\theta)\sigma_V \end{bmatrix} + [2\mu(1+\nu) + C_{55} + A_1]$$

$$\begin{bmatrix} \left(\xi_1^{HH}\sin^2\phi\sin^2\theta + \xi_1^{hh}\cos^2\phi\sin^2\theta + \xi_1^{VV}\cos^2\theta\right)\sigma_H + \\ \left(\xi_2^{HH}\sin^2\phi\sin^2\theta + \xi_2^{hh}\cos^2\phi\sin^2\theta + \xi_2^{VV}\cos^2\theta\right)\sigma_h + \\ (\cos^2\theta)\sigma_V \end{bmatrix},$$

where

-continued $$\xi_1^{HH} = \frac{1}{2}\left(2 - \frac{5a^2}{r^2} + \frac{3a^4}{r^4}\right), \quad (22)$$

$$\xi_2^{HH} = \frac{1}{2}\left(\frac{3a^2}{r^2} - \frac{3a^4}{r^4}\right),$$

$$\xi_3^{HH} = \frac{a^2}{r^2},$$

$$\xi_1^{hh} = \frac{1}{2}\left(\frac{a^2}{r^2} - \frac{3a^4}{r^4}\right),$$

$$\xi_2^{hh} = \frac{1}{2}\left(2 + \frac{a^2}{r^2} + \frac{3a^4}{r^4}\right),$$

$$\xi_3^{hh} = -\frac{a^2}{r^2},$$

$$\xi_1^{VV} = -\frac{2a^2}{r^2},$$

$$\xi_2^{VV} = \frac{2a^2}{r^2}.$$

Note that all geometric coefficients $\xi_1^{HH}$, $\xi_2^{HH}$, $\xi_3^{HH}$, $\xi_1^{hh}$, $\xi_2^{hh}$, $\xi_3^{hh}$, $\xi_1^{VV}$, and $\xi_2^{VV}$ in equation (21) from the Kirsch's equations (6) are functions of normalized radial position r/a from the borehole surface.

Similarly, we can write:

$$\Delta C_{44}^{//(\theta=90)}(r/a) = (\mu + A_1)\begin{bmatrix}\left(\psi_1^{HH}\sin^2\phi\cos^2\theta + \psi_1^{hh}\cos^2\phi\cos^2\theta + \psi_1^{VV}\sin^2\theta\right)\sigma_H + \\ \left(\psi_2^{HH}\sin^2\phi\cos^2\theta + \psi_2^{hh}\cos^2\phi\cos^2\theta + \psi_2^{VV}\sin^2\theta\right)\sigma_h + \\ (\sin^2\theta)\sigma_V + \left(\psi_3^{HH}\sin^2\phi\cos^2\theta + \psi_3^{hh}\cos^2\phi\cos^2\theta\right)\Delta P_W\end{bmatrix} + \quad (23)$$

$$[-\mu(1+2\nu) + A_2]\begin{bmatrix}(\psi_1^{HH}\cos^2\phi + \psi_1^{hh}\sin^2\phi)\sigma_H + \\ (\psi_2^{HH}\cos^2\phi + \psi_2^{hh}\sin^2\phi)\sigma_h + \\ (\psi_3^{HH}\cos^2\phi + \psi_3^{hh}\sin^2\phi)\Delta P_W\end{bmatrix} + [2\mu(1+\nu) +$$

$$C_{55} + A_1]\begin{bmatrix}\left(\psi_1^{HH}\sin^2\phi\sin^2\theta + \psi_1^{hh}\cos^2\phi\sin^2\theta + \psi_1^{VV}\cos^2\theta\right)\sigma_H + \\ \left(\psi_2^{HH}\sin^2\phi\sin^2\theta + \psi_2^{hh}\cos^2\phi\sin^2\theta + \psi_2^{VV}\cos^2\theta\right)\sigma_h + \\ (\cos^2\theta)\sigma_V + \left(\psi_3^{HH}\sin^2\phi\sin^2\theta + \psi_3^{hh}\cos^2\phi\sin^2\theta\right)\Delta P_W\end{bmatrix}$$

where $$\psi_1^{HH} = \frac{1}{2}\left(\frac{3a^2}{r^2} - \frac{3a^4}{r^4}\right), \quad (24)$$

$$\psi_2^{HH} = \frac{1}{2}\left(2 - \frac{5a^2}{r^2} + \frac{3a^4}{r^4}\right),$$

$$\psi_3^{HH} = \frac{a^2}{r^2},$$

$$\psi_1^{hh} = \frac{1}{2}\left(2 + \frac{a^2}{r^2} + \frac{3a^4}{r^4}\right),$$

$$\psi_2^{hh} = \frac{1}{2}\left(\frac{a^2}{r^2} - \frac{3a^4}{r^4}\right),$$

$$\psi_3^{hh} = -\frac{a^2}{r^2},$$

$$\psi_1^{VV} = \frac{2a^2}{r^2},$$

$$\psi_2^{VV} = -\frac{2a^2}{r^2}.$$

It is to be noted that that all geometric coefficients $\psi_1^{HH}$, $\psi_2^{HH}$, $\psi_3^{HH}$, $\psi_1^{hh}$, $\psi_2^{hh}$, $\psi_3^{hh}$, $\psi_1^{VV}$, and $\psi_2^{VV}$ in equation (23) from the Kirsch's equations (6) are functions of normalized radial position r/a from the borehole surface.

Then, equation (21) can be rewritten in a compact form shown below:

$$X_C = \frac{(A_1 + \mu)}{2\mu(1+\nu)}S_1 + \frac{[A_2 - \mu(1+2\nu)]}{2\mu(1+\nu)}S_2 + \frac{\nu[A_1 + \mu(3+2\nu)]}{2\mu(1+\nu)}S_3, \quad (25)$$

Where:

$$X_c = \Delta C_{55}^{\theta=0}(r_f) - \Delta C_{55}^{\theta=0}(r_n),$$

$$S_1 = \begin{bmatrix}\{\xi_1^{HH}(r_f) - \xi_1^{HH}(r_n)\}\cos^2\phi + \\ \{\xi_1^{hh}(r_f) - \xi_1^{hh}(r_n)\}\sin^2\phi\end{bmatrix}\sigma_H + \begin{bmatrix}\{\xi_2^{HH}(r_f) - \xi_2^{HH}(r_n)\}\cos^2\phi + \\ \{\xi_2^{hh}(r_f) - \xi_2^{hh}(r_n)\}\sin^2\phi\end{bmatrix}\sigma_h + \begin{bmatrix}\{\xi_3^{HH}(r_f) - \xi_3^{HH}(r_n)\}\cos^2\phi + \\ \{\xi_3^{hh}(r_f) - \xi_3^{hh}(r_n)\}\sin^2\phi\end{bmatrix}P_W,$$

$$S_2 = \begin{bmatrix}\{\xi_1^{HH}(r_f) - \xi_1^{HH}(r_n)\}\sin^2\phi\cos^2\theta + \\ \{\xi_1^{hh}(r_f) - \xi_1^{hh}(r_n)\}\cos^2\phi\cos^2\theta + \\ \nu\{\xi_1^{VV}(r_f) - \xi_1^{VV}(r_n)\}\sin^2\theta\end{bmatrix}\sigma_H + \begin{bmatrix}\{\xi_2^{HH}(r_f) - \xi_2^{HH}(r_n)\}\sin^2\phi\cos^2\theta + \\ \{\xi_2^{hh}(r_f) - \xi_2^{hh}(r_n)\}\cos^2\phi\cos^2\theta + \\ \nu\{\xi_2^{VV}(r_f) - \xi_2^{VV}(r_n)\}\sin^2\theta\end{bmatrix}\sigma_h + \begin{bmatrix}\{\xi_3^{HH}(r_f) - \xi_3^{HH}(r_n)\}\sin^2\phi\cos^2\theta + \\ \{\xi_3^{hh}(r_f) - \xi_3^{hh}(r_n)\}\cos^2\phi\cos^2\theta\end{bmatrix}P_W,$$

$$S_3 = \begin{bmatrix}\{\xi_1^{HH}(r_f) - \xi_1^{HH}(r_n)\}\sin^2\phi\sin^2\theta + \\ \{\xi_1^{hh}(r_f) - \xi_1^{hh}(r_n)\}\cos^2\phi\sin^2\theta + \\ \nu\{\xi_1^{VV}(r_f) - \xi_1^{VV}(r_n)\}\cos^2\theta\end{bmatrix}\sigma_H + \begin{bmatrix}\{\xi_2^{HH}(r_f) - \xi_2^{HH}(r_n)\}\sin^2\phi\sin^2\theta + \\ \{\xi_2^{hh}(r_f) - \xi_2^{hh}(r_n)\}\cos^2\phi\sin^2\theta + \\ \nu\{\xi_2^{VV}(r_f) - \xi_2^{VV}(r_n)\}\cos^2\theta\end{bmatrix}\sigma_h + \begin{bmatrix}\{\xi_3^{HH}(r_f) - \xi_3^{HH}(r_n)\}\sin^2\phi\sin^2\theta + \\ \{\xi_3^{hh}(r_f) - \xi_3^{hh}(r_n)\}\cos^2\phi\sin^2\theta\end{bmatrix}P_W,$$

where $r_f$ and $r_n$ denote the far and near normalized radial distances from the borehole surface used in the difference equations. Note that the near normalized radial distance must be outside any plastically yielded region of the rock.

Similarly, we form another difference equation. To that end, equations (22) and (23) can be rewritten in a compact form as shown below:

$$Y_C = \frac{(A_1 + \mu)}{2\mu(1+\nu)}S_4 + \frac{[A_2 - \mu(1+2\nu)]}{2\mu(1+\nu)}S_5 + \frac{\nu[A_1 + \mu(3+2\nu)]}{2\mu(1+\nu)}S_6, \quad (26)$$

where $$Y_c = \Delta C_{44}^{\theta=90}(r_f) - \Delta C_{55}^{\theta=0}(r_n),$$

$$S_4 = \begin{bmatrix}\{\psi_1^{HH}(r_f)\}\sin^2\phi\cos^2\theta - \{\xi_1^{hh}(r_n)\}\cos^2\phi + \\ \{\psi_1^{hh}(r_f)\}\cos^2\phi\cos^2\theta - \{\xi_1^{hh}(r_n)\}\sin^2\phi\end{bmatrix}$$

-continued $$\sigma_H + \begin{bmatrix} \{\psi_2^{HH}(r_f)\}\sin^2\phi\cos^2\theta - \{\xi_2^{HH}(r_n)\}\cos^2\phi + \\ \{\psi_2^{hh}(r_f)\}\cos^2\phi\cos^2\theta - \{\xi_2^{hh}(r_n)\}\sin^2\phi \end{bmatrix}$$

$$\sigma_h + \begin{bmatrix} \{\psi_3^{HH}(r_f)\}\sin^2\phi\cos^2\theta - \{\xi_3^{HH}(r_n)\}\cos^2\phi + \\ \{\psi_3^{hh}(r_f)\}\cos^2\phi\cos^2\theta - \{\xi_3^{hh}(r_n)\}\sin^2\phi \end{bmatrix} P_w,$$

$$S_5 = \begin{bmatrix} \{\psi_1^{HH}(r_f)\}\cos^2\phi - \{\xi_1^{HH}(r_n)\}\sin^2\phi\cos^2\theta + \\ \{\psi_1^{hh}(r_f)\}\sin^2\phi - \{\xi_1^{hh}(r_n)\}\cos^2\phi\cos^2\theta \end{bmatrix}$$

$$\sigma_H + \begin{bmatrix} \{\psi_2^{HH}(r_f)\}\cos^2\phi - \{\xi_2^{HH}(r_n)\}\sin^2\phi\cos^2\theta + \\ \{\psi_2^{hh}(r_f)\}\sin^2\phi - \{\xi_2^{hh}(r_n)\}\cos^2\phi\cos^2\theta \end{bmatrix}$$

$$\sigma_h + \begin{bmatrix} \{\psi_3^{HH}(r_f)\}\cos^2\phi - \{\xi_3^{HH}(r_n)\}\sin^2\phi\cos^2\theta + \\ \{\psi_3^{hh}(r_f)\}\sin^2\phi - \{\xi_3^{hh}(r_n)\}\cos^2\phi\cos^2\theta \end{bmatrix} P_w,$$

$$S_6 = \begin{bmatrix} \{\psi_1^{HH}(r_f)\}\sin^2\phi\sin^2\theta - \{\xi_1^{HH}(r_n)\}\sin^2\phi\sin^2\theta + \\ \{\psi_1^{hh}(r_f) - \xi_1^{hh}(r_n)\}\cos^2\phi\sin^2\theta + \\ \nu\{\psi_2^{VV}(r_f) - \xi_2^{VV}(r_n)\}\cos^2\theta \end{bmatrix}$$

$$\sigma_H + \begin{bmatrix} \{\psi_2^{HH}(r_f) - \xi_2^{HH}(r_n)\}\sin^2\phi\sin^2\theta + \\ \{\psi_2^{hh}(r_f) - \xi_2^{hh}(r_n)\}\cos^2\phi\sin^2\theta + \\ \nu\{\psi_2^{VV}(r_f) - \xi_2^{VV}(r_n)\}\cos^2\theta \end{bmatrix}$$

$$\sigma_h + \begin{bmatrix} \{\psi_3^{HH}(r_f) - \xi_3^{HH}(r_n)\}\sin^2\phi\sin^2\theta + \\ \{\psi_3^{hh}(r_f) - \xi_3^{hh}(r_n)\}\cos^2\phi\sin^2\theta \end{bmatrix} P_w,$$

We can solve for $A_1$ and $A_2$ from equations (25) and (26) and express them as shown below:

$$A_1 = \frac{K_1}{S_5(S_1 + \nu S_3) - S_2(S_4 + \nu S_6)}, \quad (27)$$

and $$A_2 = \frac{K_2}{S_5(S_1 + \nu S_3) - S_2(S_4 + \nu S_6)}, \quad (28)$$

where $$K_1 = \mu \begin{bmatrix} -S_5\{S_1 + S_3\nu(2\nu + 3)\} + S_2\{S_4 + \nu S_6(2\nu + 3) + \\ 2S_5(1+\nu)X_C - 2S_2(1+\nu)Y_C \end{bmatrix}, \quad (29)$$

$$K_2 = \mu \begin{bmatrix} \nu S_3\{2S_4 + S_5 + 2\nu(S_4 + S_5)\} - S_2(1+2\nu) \\ (S_4 + \nu S_6) + S_1\{2\nu S_5 + S_5 - 2S_6\nu(1+\nu)\} - \\ 2(1+\nu)(S_4 + \nu S_6)X_C + 2(1+\nu)(S_1 + \nu S_3)Y_C \end{bmatrix}. \quad (30)$$

We can now express the nonlinear constants $C_{144}$ and $C_{155}$ in terms of $A_1$ and $A_2$, and the acoustoelastic coefficient $A_E$ can also be expressed in terms of $A_1$ and $A_2$ as shown below:

$$C_{144} = \frac{2\nu A_1 + (1-\nu)A_2}{(1-2\nu)(1+\nu)}, \quad C_{155} = \frac{A_1 + \nu A_2}{(1-2\nu)(1+\nu)}, \quad (31)$$

$$C_{155} - C_{144} = \frac{A_1 - A_2}{1+\nu}, \quad (32)$$

$$A_E^{Model} = 2 + \frac{1}{2\mu}(C_{155} - C_{144}) = 2 + \frac{A_1 - A_2}{2\mu(1+\nu)}. \quad (33)$$

A model derived acoustoelastic coefficient $A_E$ can now be compared with data derived acoustoelastic coefficient given by:

$$A_E^{Data} = \frac{C_{55}^{//} - C_{66}^{//}}{\sigma_V^{//} - \sigma_h^{//}} = \frac{C_{44}^{//} - C_{66}^{//}}{\sigma_V^{//} - \sigma_H^{//}}. \quad (34)$$

Next we can express deviated borehole stresses along the radial, hoop and axial directions in terms of the formation principal stresses and borehole azimuth $\phi$ measured from the maximum horizontal stress direction, and borehole deviation $\theta$ from the vertical.

$$\frac{\sigma_H^{//}}{\sigma_V^{//}} = \frac{\cos^2\phi\frac{\sigma_H}{\sigma_V} + \sin^2\phi\frac{\sigma_h}{\sigma_V}}{\sin^2\phi\sin^2\theta\frac{\sigma_H}{\sigma_V} + \cos^2\phi\sin^2\theta\frac{\sigma_h}{\sigma_V} + \cos^2\theta}, \quad (35)$$

where $\sigma_V$, $\sigma_H$ and $\sigma_h$ denote the formation vertical, maximum horizontal and minimum horizontal stresses, respectively. Similarly, we can express the ratio of borehole hoop and axial stresses as:

$$\frac{\sigma_h^{//}}{\sigma_V^{//}} = \frac{\sin^2\phi\cos^2\theta\frac{\sigma_H}{\sigma_V} + \cos^2\phi\cos^2\theta\frac{\sigma_h}{\sigma_V} + \sin^2\theta}{\sin^2\phi\sin^2\theta\frac{\sigma_H}{\sigma_V} + \cos^2\phi\sin^2\theta\frac{\sigma_h}{\sigma_V} + \cos^2\theta}. \quad (36)$$

Using equations (18), (35) and (36), we can now express $\sigma_h/\sigma_V$ in terms of $\sigma_H/\sigma_V$, measured shear moduli referred to the deviated borehole axes, and deviated borehole orientation referred to the principal stress directions.

$$\frac{\sigma_h}{\sigma_V} = \left(\frac{B_1}{B_3}\right)\left(\frac{\sigma_H}{\sigma_V}\right) - \left(\frac{B_2}{B_3}\right), \quad (37)$$

where $$B_1 = R_1\sin^2\phi\sin^2\theta + R_2\sin^2\phi\cos^2\theta + \cos^2\theta, \quad (38)$$
$$B_2 = R_1\cos^2\theta + R_2\sin^2\theta,$$
$$B_3 = R_1\cos^2\phi\sin^2\theta + R_2\cos^2\phi\cos^2\theta,$$
$$R_1 = \frac{C_{55}^{//} - C_{44}^{//}}{C_{55}^{//} - C_{66}^{//}}, \quad R_2 = \frac{C_{44}^{//} - C_{66}^{//}}{C_{55}^{//} - C_{66}^{//}},$$

The ratio of minimum horizontal to overburden stress $\sigma_h/\sigma_V$ can also be expressed in another form as shown below:

$$\frac{\sigma_h}{\sigma_V} = \left(\frac{C_1}{C_2}\right)\left(\frac{\sigma_H}{\sigma_V}\right) - \frac{C_3}{C_2}, \quad (39)$$

where $$C_1 = [R_1\sin^2\phi(\sin^2\theta - \cos^2\theta) + (\sin^2\phi\cos^2\theta - \cos^2\phi)], \quad (40)$$
$$C_2 = [\sin^2\phi - \cos^2\phi\cos^2\theta + R_1\cos^2\phi(\cos^2\theta - \sin^2\theta)],$$
$$C_3 = R_1(\sin^2\theta - \cos^2\theta).$$

Note that the ratio of minimum horizontal to overburden stress $\sigma_h/\sigma_V$ can be related to the ratio of maximum horizontal to overburden stress $\sigma_H/\sigma_V$ by either equation (37) or (39). Both of these relations require estimates of the three far-field shear moduli referred to the deviated borehole axes and the borehole azimuth and deviation referred to the principal stress directions.

Inversion Model for Estimating Both $\sigma_H$ and $\sigma_h$

In one embodiment of the invention, estimation of the maximum and minimum horizontal stresses comprises the following steps:

1. $\sigma_h/\sigma_V$ is expressed in terms of $\sigma_H/\sigma_V$ either from equation (37) or (39).
2. $A_1$ and $A_2$ are calculated from equations (27) and (28) in terms of $\sigma_H/\sigma_V$.
3. Acoustoelastic parameter $A_E$ (model) is then calculated as a function the stress ratio $\sigma_H/\sigma_V$.
4. $A_E$ (data) is calculated from equation (33) in terms of $C_{55}$, $C_{44}$, $\sigma_H$, and $\sigma_h$.
5. The error $\epsilon=\text{Abs}\left[\{A_E(\text{model})-A_E(\text{data})\}/A_E(\text{data})\right]$, is minimized as a function of $\sigma_H/\sigma_V$.
6. Estimated value of $\sigma_H/\Sigma_V$ is obtained when the error $\epsilon$ is minimum.
7. $\sigma_h/\Sigma_V$ is finally calculated using either equation (37) or (39) in terms of $\sigma_H/\sigma_V$.

Inversion Model for Estimating $\sigma_H$

In another embodiment of the invention, when the overburden stress $\sigma_V$ is known from the integration of the formation bulk density, and minimum horizontal stress $\sigma_h$ is known from other sources (such as, a mini-frac test or an extended leak-off test (XLOT) known in the prior-art ("The use of leak-off tests as means of predicting minimum in-situ stress", by Adrian J. White, Martin O. Traugott and Richard E. Swarbrick, Petroleum Geoscience, vol. 8, no. 2, pp. 189-193, June 2002), estimation of the maximum horizontal stress $\sigma_H$ is carried out based on the following analysis:

Assume that $\sigma_V$, $\sigma_H$, and $\sigma_h$ are the formation principal stresses and $\sigma_V''$, $\sigma_H''$, and $\sigma_h''$ are the rotated stresses parallel to the $X_3''$, $X_1''$, and $X_2''$ axes, respectively; and the borehole is parallel to the $X_3''$ axis.

When $C''_{55} > C''_{44}$, we have $$C_{55}''-C_{66}''=A_E(\sigma_V''-\sigma_h''), \quad (41)$$

$$C_{44}''-C_{66}''=A_E(\sigma_V''-\sigma_H''), \quad (42)$$

$$C_{55}''-C_{44}''=A_E(\sigma_H''-\sigma_h''), \quad (43)$$

Combining equations (41) and (43), we can solve for $\sigma_H$ and it can be expressed as $$\sigma_H = \frac{(a_2 - R_1 a_5)}{(R_1 a_4 - a_1)}\sigma_h + \frac{(a_3 - R_1 a_6)}{(R_1 a_4 - a_1)}\sigma_V, \quad (44)$$

where $$R_1 = \frac{C_{55}^{//} - C_{44}^{//}}{C_{55}^{//} - C_{66}^{//}}, \quad (45)$$

$$a_1 = \cos^2\phi - \sin^2\phi\cos^2\theta, \quad (46)$$
$$a_2 = \sin^2\phi - \cos^2\phi\cos^2\theta,$$
$$a_3 = -\sin^2\theta,$$
$$a_4 = \sin^2\phi(\sin^2\theta - \cos^2\theta),$$
$$a_5 = \cos^2\varphi(\sin^2\theta - \cos^2\theta),$$
$$a_6 = \cos^2\theta - \sin^2\theta,$$

The acoustoelastic coefficient $A_E$ can be calculated from equation (47) or (48):

$$A_E = \frac{C_{55}^{//} - C_{66}^{//}}{a_4\sigma_H + a_5\sigma_h + a_6\sigma_V}, \quad (47)$$

or $$A_E = \frac{C_{55}^{//} - C_{44}^{//}}{a_1\sigma_H + a_2\sigma_h + a_3\sigma_V}. \quad (48)$$

Fast and Slow Dipole Dispersions Overlay

Figure 4:
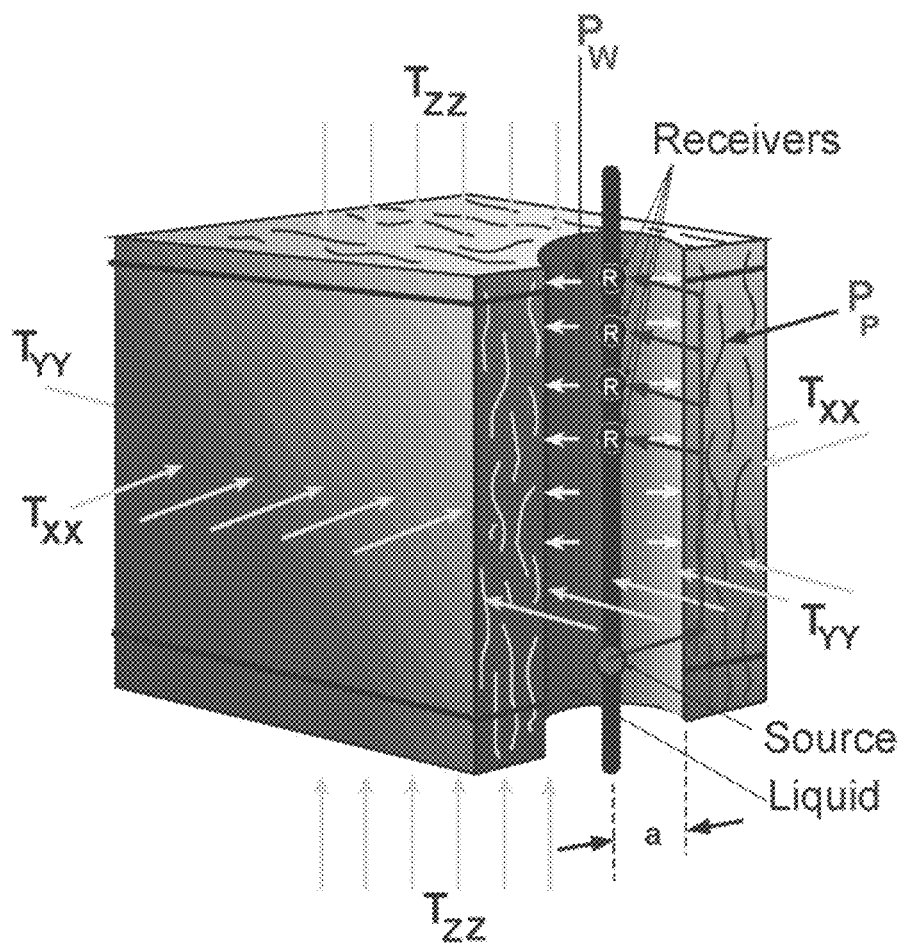
FIG. 4 illustrates a schematic of a borehole in the presence of formation stresses with the borehole axis parallel to the overburden stress Sv and where the two horizontal stresses are the same (SHmax=Shmin=SH)

FIG. 4 shows another embodiment of a method according to the invention. FIG. 4 represents a schematic diagram of a fluid-filled borehole in a formation subject to an overburden stress Sv and isotropic horizontal stresses (SHmax=Shmin=$S_H$). Under this situation, the fast and slow dipole dispersions obtained from cross-dipole waveforms coincide with each other implying isotropy in the azimuthal shear velocities or slownesses.

When normal stresses in the cross-sectional plane of a deviated wellbore are nearly the same, the far-field stresses satisfy the following relations as shown below:

$$\sigma_H''=\sigma_h'', (\cos^2\phi-\sin^2\phi\cos^2\theta)\sigma_H=(\cos^2\phi\cos^2\theta-\sin^2\phi)\sigma_h+\sin^2\theta\sigma_V, \quad (41)$$

and the near-field stresses satisfy the following relations as given below:

$$\sigma_H^{//}\left(\frac{r}{a}\right) = \sigma_h^{//}\left(\frac{r}{a}\right), \quad (42)$$

$$\begin{bmatrix}\xi_1^{HH}(\cos^2\phi - \sin^2\phi\cos^2\theta) + \\ \xi_1^{hh}(\sin^2\phi - \cos^2\phi\cos^2\theta) + \xi_2^{VV}v\sin^2\theta\end{bmatrix}$$
$$\sigma_H + [\xi_3^{hh}(\sin^2\phi - \cos^2\phi)(1 + \cos^2\theta)]\Delta P_W =$$
$$\begin{bmatrix}\xi_2^{HH}(\sin^2\phi\cos^2\theta - \cos^2\phi) + \\ \xi_2^{hh}(\cos^2\phi\cos^2\theta - \sin^2\phi) + \xi_2^{VV}v\sin^2\theta\end{bmatrix}\sigma_h ++[\sin^2\theta]\sigma_V,$$

where the geometric coefficients $\xi_1^{HH}$, $\xi_1^{hh}$, . . . are defined in equations (22). Under these circumstances, the fast and slow dipole dispersions overlay and the effective shear moduli in the two orthogonal axial planes of a deviated borehole are equal, $C_{55}''=C_{44}''$.

In this special case also, we can solve for the parameters $A_1$ and $A_2$ from the two difference equations formed by $C_{55}''$ and $C_{44}''$, to express $A_E^{Model}$ as shown below:

$$A_E^{Model} = 2 + \frac{1}{2\mu}(C_{155} - C_{144}) = 2 + \frac{A_1 - A_2}{2\mu(1+v)}, \quad (43)$$

and $A_E^{Data}$ is given by:

$$A_E^{Data} = \frac{C_{55}^{//} - C_{66}^{//}}{(\sigma_H\sin^2\phi + \sigma_h\cos^2\phi - \sigma_V)(\sin^2\theta - \cos^2\theta)}. \quad (44)$$

Next we can minimize the error $\epsilon$ as a function of $\sigma_H/\sigma_V$:

$$\varepsilon = \left|\frac{A_E^{Model} - A_E^{Data}}{A_E^{Data}}\right|, \quad (45)$$

and calculate the minimum horizontal stress magnitude using equation (41).

Stress Magnitude Estimation in Permeable Reservoirs

An example of embodiment of the method of the invention can be implemented to estimate stress magnitude in Transversely-Isotropic (TI)-shales. Stress magnitude estimation algorithms assume that the observed differences in the three shear moduli are caused by differences in the three formation principal stresses.

However, when fluid permeability and stress-induced effects are simultaneously present on the measured effective shear moduli in a permeable reservoir, it is necessary to remove mobility-induced bias from the stress magnitude estimation workflow. The presence of fluid mobility causes a decrease in the Stoneley shear modulus $C_{66}$ that can be estimated when fluid mobility/permeability is known from an independence source, such as core data or NMR. When dealing with deviated, highly deviated or horizontal well, it is possible to modify the measured Stoneley shear modulus $C_{66}$ and input the modified $C_{66}'$ ($>C_{66}$) into the stress magnitude estimation algorithm.

Otherwise, the formation overburden to horizontal stress ratio can be obtained as a function of parameter $\gamma = C'_{66}/C_{66}$ ($>1$). Generally, this parameter $\gamma$ can vary from 1 to 1.15.

Stress Magnitude Estimation in TI-Shales

Recall that stress magnitude estimation algorithms assume that differences in the three shear moduli are solely caused by differences in the three principal stresses.

However, transversely-isotropic shales in the absence of stresses exhibit larger shear modulus $C_{66}$ in the isotropic plane than the shear moduli $C_{44}$ and $C_{55}$ in the two orthogonal axial planes containing the borehole axis and orthogonally polarized shear polarization directions.

Therefore, it is necessary to remove any differences between $C_{66}$ and $C_{44}$ caused by structural anisotropy and invert any remaining differences in shear moduli for formation stress magnitudes.

Illustrative Example I

We analyze sonic data acquired with a logging tool as shown on FIG. 1 in a deviated well in a depleted field. The well azimuth is 331.5 degrees from the North and well deviation is 35 degrees from the vertical.

Dipole Shear Slowness Anisotropy in a Deviated Borehole

Figure 5:
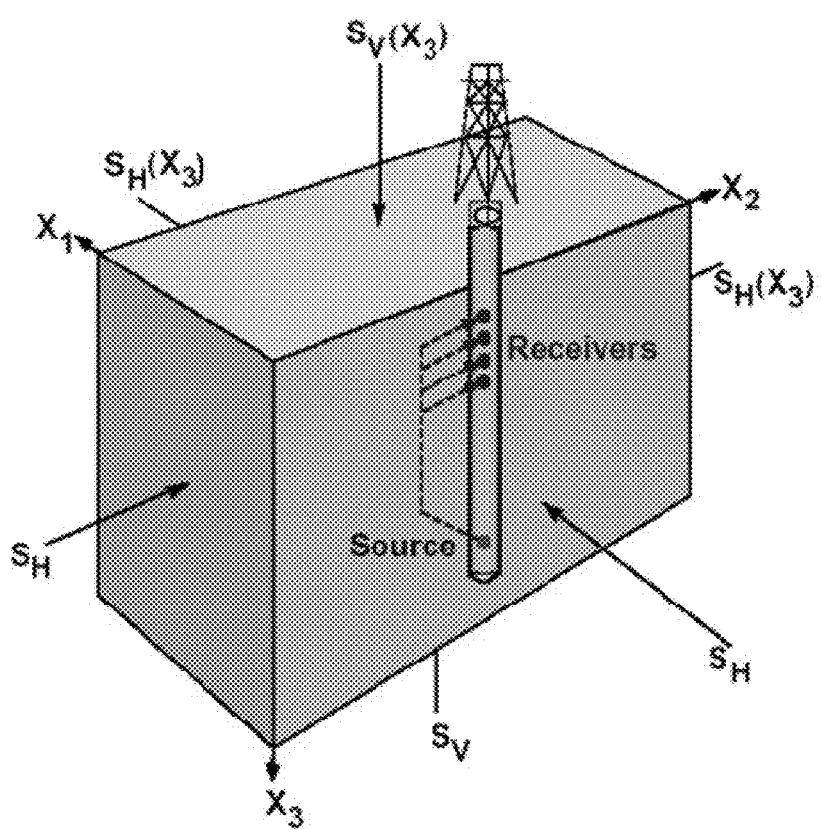
FIG. 5 shows measured Stoneley and cross-dipole dispersion in a deviated borehole.
Figure 6:
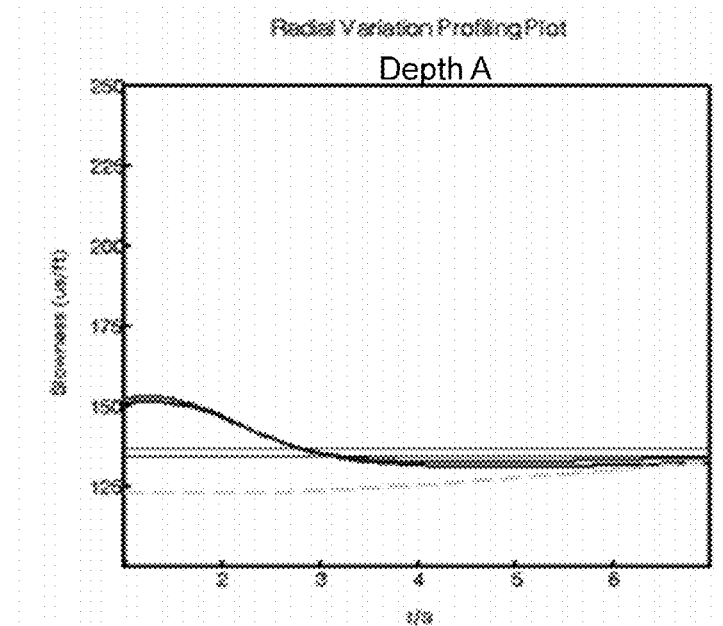
FIG. 6 illustrates radial profiles of the three formation shear slownesses.
Figure 7:
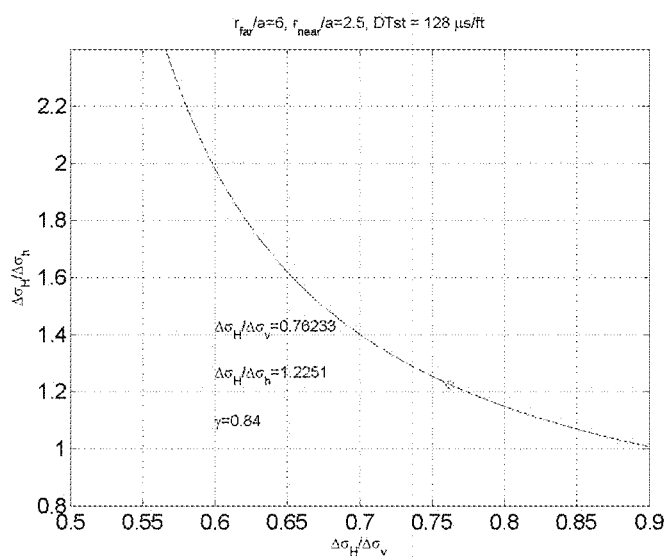
FIG. 7 illustrates formation far-field $\Delta\sigma_H/\Delta\sigma_h$ plotted as a function of $\Delta\sigma_H/\Delta\sigma_v$ obtained from the measured shear moduli referred to the deviated borehole axis.
Figure 8:
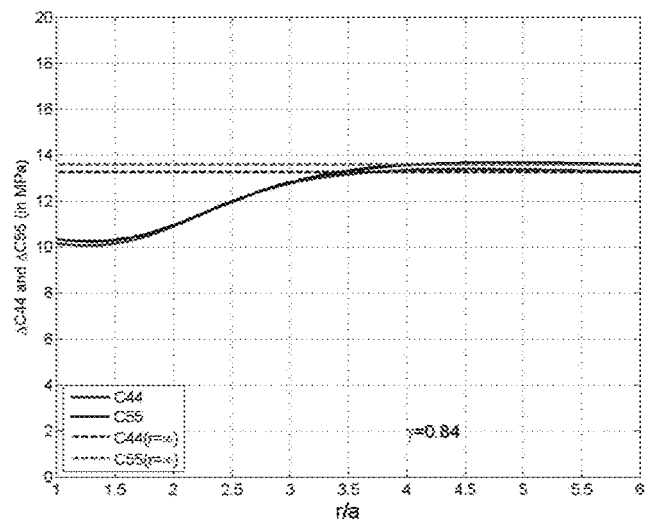
FIG. 8 illustrates radial profiles of the dipole fast and slow shear moduli obtained from the inversion of cross-dipole dispersions.
Figure 9:
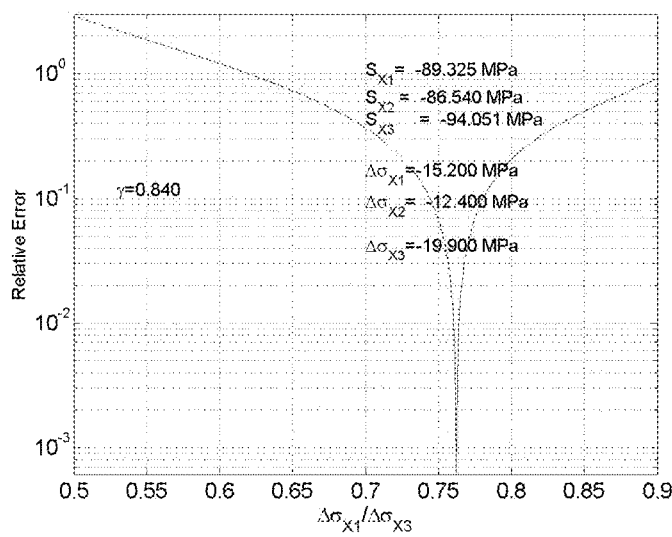
FIG. 9 illustrates the relative error plotted as a function of $\Delta\sigma_{X1}/\Delta\sigma_{X3}$ (=$\Delta\sigma_H/\Delta\sigma_v$)
Figure 10:
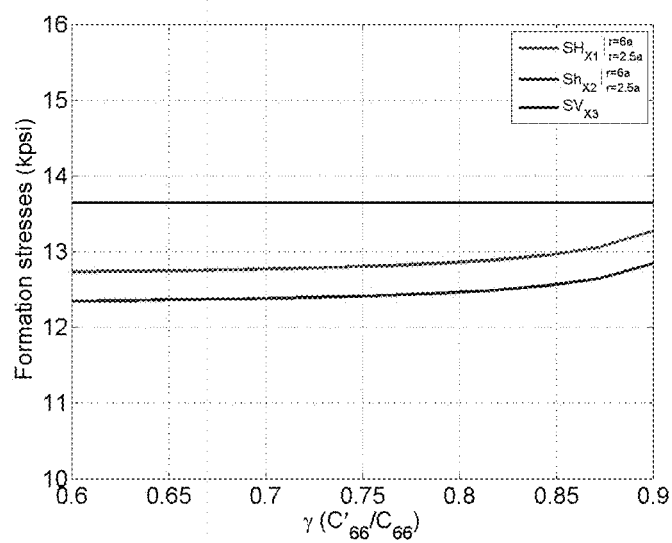
FIG. 10 illustrates estimated formation horizontal stresses plotted as a function of parameter γ.

FIG. 5 displays slowness dispersion plot for the measured Stoneley and cross-dipole dispersions and FIG. 6 displays radial variation profiling plot of radial profiles of the fast (FS) and slow (SS) dipole shear and Stoneley shear slownesses. FIG. 7 depicts the relationship between $\sigma_H/\sigma_h$ and $\sigma_H/\sigma_V$ obtained for a chosen parameter $\gamma(=C_{66}^*/C_{66})=1.01$ using the far-field shear moduli $C_{44}''$, $C_{55}''$, and $C_{66}''$. The parameter $\gamma$ enables us to estimate possible variations in stress magnitude estimates caused by a possible bias on measured $C_{66}$ due to either fluid mobility or shale structural anisotropy. FIG. 8 shows radial profiles of the three shear moduli obtained from the corresponding shear slownesses shown in FIG. 5. In FIG. 9, we show minimization of the cost function defined in terms of $A_E$ (model) and $A_E$ (data) as a function of $\sigma_H/\sigma_V$. Note that $\sigma_H$ and $\sigma_V$ are stresses along the $X_1$- and $X_3$-directions, respectively. Remember that it is possible that $\sigma_H$ might be less than ah oriented along the $X_2$-direction. FIG. 10 illustrates how the horizontal stress estimates might change as a function of the parameter $\gamma$.

Estimation of the Maximum Horizontal Stress Direction

Sonic data from a deviated wellbore can be inverted according to an embodiment of the method of the invention for the maximum and minimum horizontal stress magnitudes. When the wellbore orientation is expressed in terms of well azimuth measured from the North and deviation from the vertical, it is likely that the maximum horizontal stress direction would not be aligned with the North direction. However, it is possible to calculate the maximum horizontal and minimum horizontal stress magnitudes as a function of well azimuth. If we have an independent estimate of the minimum horizontal stress magnitude from a mini-frac or Extended Leak-Off Test (XLOT) in the same field, we can then estimate the deviated wellbore azimuth measured from the SHmax direction. (Details of the XLOT and mini-frac tests are described in the prior-art by A. M. Raaen, P. Horsrud, H. Kjorholt, and D. Okland, "Improved routine estimation of the minimum horizontal stress component from extended leak-off test", International Journal of Rock Mechanics and Mining Sciences, vol. 43, pp. 37-48, 2006; and J. Desroches and A. Kurkjian, "Applications of wireline stress measurements", SPE 48960, 1998). Consequently, the azimuth of SHmax from the North can be calculated from the difference equation given below:

$$\phi SHmax/\text{North} = \phi \text{Borehole}/\text{North} - \phi \text{Borehole}/SHmax, \quad (46)$$

where the azimuth $\phi$Borehole/SHmax is estimated from a sensitivity analysis of SHmax and Shmin to changes in the borehole azimuth referred to the SHmax direction and an independent estimate of the Shmin magnitude from known tests like a minifrac test or extended leak-off test (XLOT) in the same field.

Figure 11:
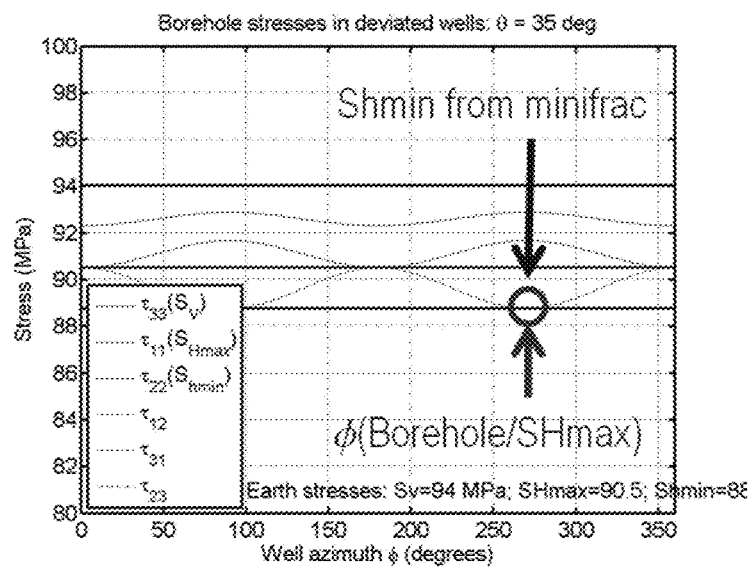
FIG. 11 illustrates the rotation of formation far-field principal stresses Sv=94 MPa; SHmax=90.5; and Shmin=88.8, where the azimuth is measured from the maximum horizontal stress direction SHmax, well deviation fixed at 35.2 degrees from the maximum horizontal stress (SHmax) direction.
Figure 12:
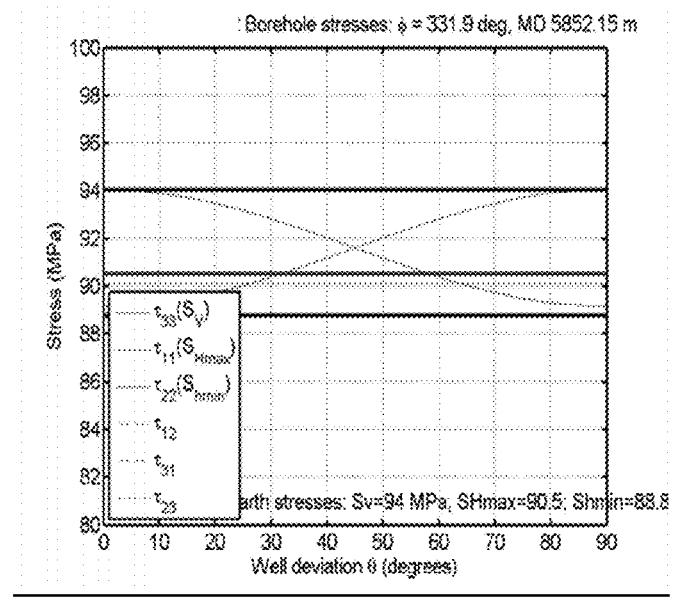
FIG. 12 illustrates rotation of formation fr-field principal stresses Sv=94 MPA; SHmax=90.5; and Shmin=88.8, where the well azimuth is measured form the maximum horizontal stress direction SHmax. Well azimuth being fixed at 331.9 degrees from the maximum horizontal stress (SHmax) direction.

FIG. 11 shows the far-field axial ($T_{33}$), hoop ($T_{22}$), and radial ($T_{11}$) stresses as a function of well azimuth ($\phi$) measured from the North and a fixed well deviation of 35 degrees. These results indicate the hoop and radial stresses in the borehole cross-sectional plane are the same for well azimuths of 0 and 180 degrees. Therefore at these azimuths, the fast and slow dipole dispersions will overlay even though the formation principal stresses Sv, SHmax, and Shmin are different. Similarly, FIG. 12 displays the far-field axial ($T_{33}$), hoop ($T_{22}$), and radial ($T_{11}$) stresses as a function of well deviation ($\theta$) for a fixed well azimuth of 331.9 degrees from the North. These results suggest that the measured fast and slow dipole dispersions will overlay for a well deviation of about 27 degrees. Recall that the well deviation $\theta$ from the vertical is defined by a second rotation of the orthogonal axes about the $X_1'$-axis. FIG. 11 illustrates how the horizontal stress estimates might change as a function of the wellbore azimuth $\phi$. As stated earlier, an embodiment of the model according to the invention assumes that the wellbore azimuth is measured from the maximum horizontal stress direction. We can therefore, estimate $\phi$Borehole/SHmax from FIG. 11 by selecting an azimuth that is consistent with the Shmin estimated from an independent source, such as the known tests referred to earlier. Since the wellbore azimuth $\phi$Borehole/North is known, we can thus estimate the maximum horizontal stress direction referred to the North from equation (46).

Figure 13:
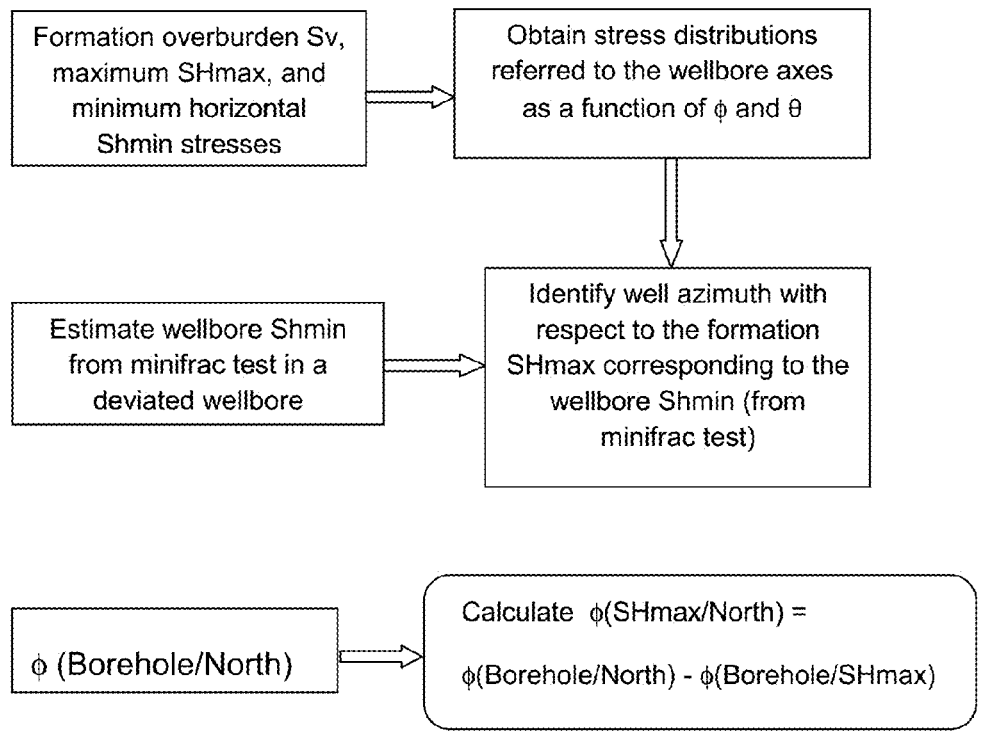
FIG. 13 illustrated a flowchart for the estimation of maximum horizontal stress direction using sonic data from deviated boreholes.

FIG. 13 shows an example of a flow chart according to an embodiment of the invention for the estimation of maximum horizontal stress direction using sonic data from deviated wellbores and minifrac tests yielding minimum stress referred to the deviated wellbore axes.

Negligible Dipole Shear Slowness Anisotropy in a Deviated Borehole

Next we describe results for the maximum and minimum horizontal stress magnitudes in an interval where the fast and slow dipole dispersions overlay implying that the stresses in the deviated borehole cross-sectional plane are isotropic (i.e., $\sigma_{11}'' = \sigma_{22}''$).

Figure 14:
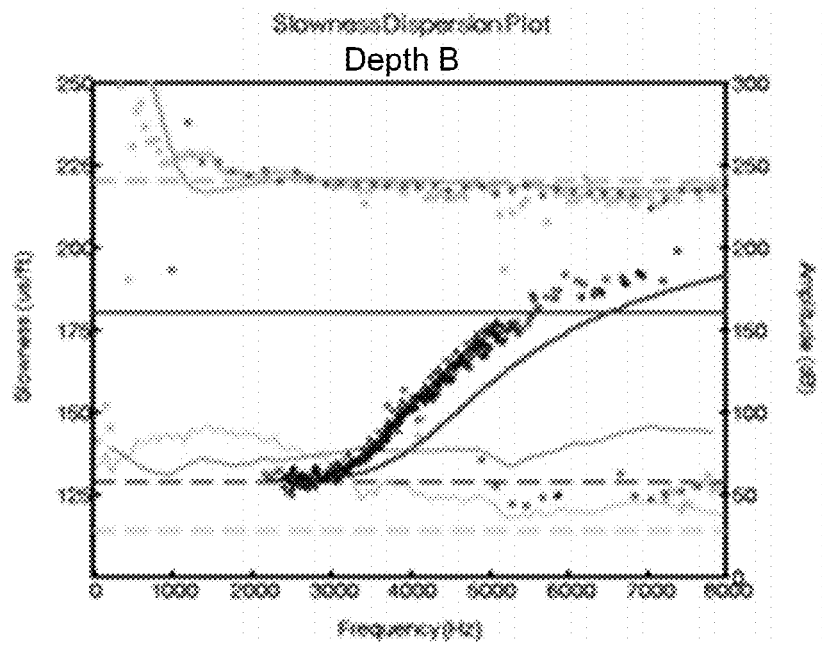
FIG. 14 shows measured Stoneley and cross-dipole dispersions in a deviated borehole.
Figure 15:
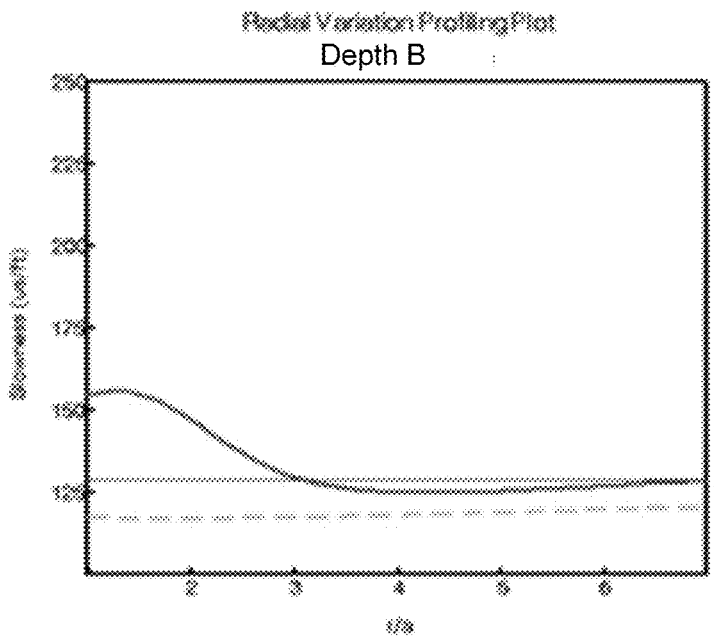
FIG. 15 shows radial profiles of the two formation shear slownesses.
Figure 16:
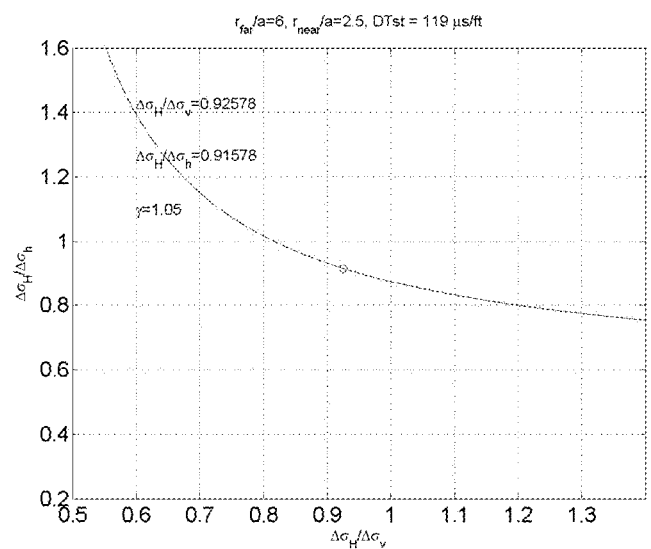
FIG. 16 illustrates formation far-field $\Delta\sigma_H/\Delta\sigma_h$ plotted as a function of $\Delta\sigma_H/\Delta\sigma_v$ obtained front h measured shear moduli referred to the deviated borehole axis.
Figure 17:
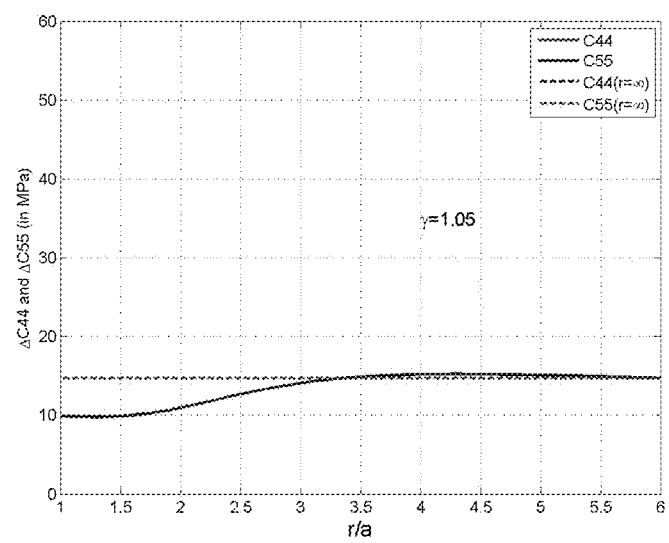
FIG. 17 illustrates radial profiles of the dipole fast and slow shear moduli obtained from the inversion of cross-dipole dispersions.
Figure 18:
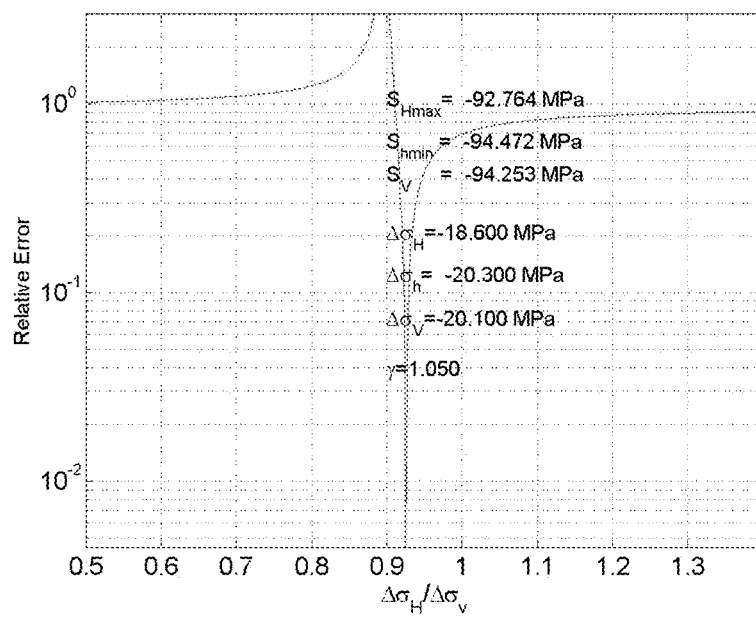
FIG. 18 illustrates the relative error plotted as a function of $\Delta\sigma_{X1}/\Delta\sigma_{X3}$ (=$\Delta\sigma_H/\Delta\sigma_v$)
Figure 19:
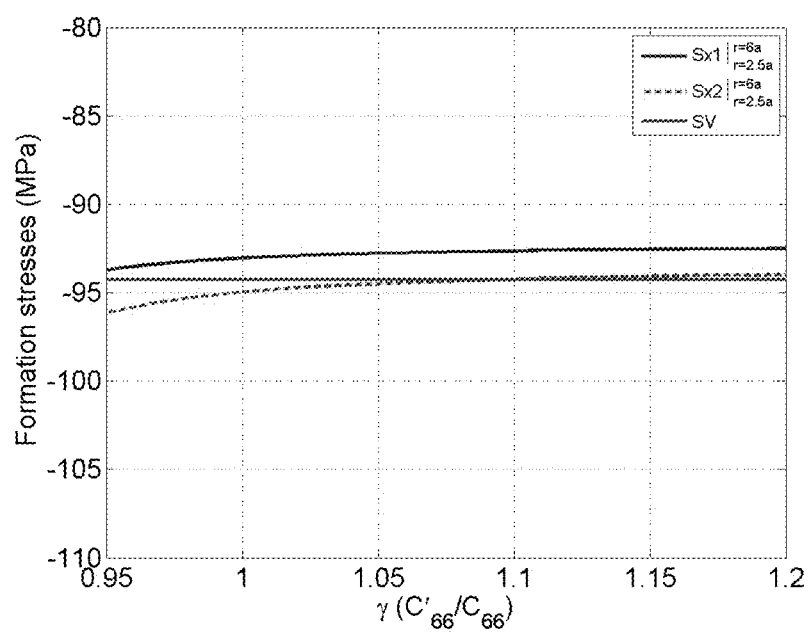
FIG. 19 illustrates estimated formation horizontal stresses plotted as a function of parameter γ.

FIG. 14 displays the measured Stoneley and cross-dipole dispersions at depth of 5862.06 m, while FIG. 15 depicts a radial profile of the dipole shear and Stoneley shear slownesses. FIG. 16 depicts the relationship between $\sigma_H/\sigma_h$ and $\sigma_H/\sigma_V$ obtained for a chosen $\gamma(=C_{66}^*/C_{66})=1.05$ using the far-field shear moduli $C_{44}"(=C_{55}")$, and $C_{66}"$. The parameter γ enables us to estimate possible variations in stress magnitude estimates caused by a possible bias on measured $C_{66}$ due to either fluid mobility or shale structural anisotropy. FIG. 17 shows the radial profile of dipole shear modulus ($C_{44}"(=C_{55}")$), obtained from the corresponding shear slowness shown in FIG. 14. In FIG. 18, we show minimization of the cost function defined in terms of $A_E$ (model) and $A_E$ (data) as a function of $\sigma_H/\sigma_V$. Note that $\sigma_H$ and $\sigma_V$ are stresses along the $X_1$- and $X_3$-directions, respectively. Remember that it is possible that $\sigma_H$ might be less than $\sigma_h$ oriented along the $X_2$-direction. FIG. 19 illustrates how the horizontal stress estimates would change as a function of the parameter γ. Advantageously, a proper choice of parameter γ; removes any structural anisotropy effects or fluid mobility effects on the sonic data and provides reliable estimates of formation horizontal stress magnitudes.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

Embodiments of the invention comprise inversion algorithms that provide estimates of the maximum horizontal and minimum horizontal stress magnitudes and directions referred to the earth axes, ie, a trihedron of orthogonal axis containing the vertical axis. These algorithms invert measured Stoneley and cross-dipole dispersions obtained from sonic data acquired in deviated, highly deviated or horizontal wellbores. The estimation of formation stress magnitudes comprises an acoustoelastic model that relates changes in the sonic or seismic velocities to corresponding changes in stresses in the propagating medium. Measured borehole dispersions are transformed into radial variations in the three shear moduli in the three orthogonal planes.

Difference equations in the far-field shear moduli together with differences in shear moduli at two radial positions enable us to invert for the horizontal stress magnitudes and formation nonlinear constants that are related to the stress coefficients of velocities. Radial positions for the difference equations are selected to be sufficiently away from the borehole surface not to exhibit any plastic deformation. Sonic data from deviated boreholes can also be used to estimate the maximum horizontal stress direction from the North in terms of the borehole azimuth from the North and the borehole azimuth from the maximum horizontal stress direction provided the overburden and minimum horizontal stress magnitudes are known from other sources.

What is claimed is:

1. A method for estimating maximum and minimum horizontal stresses in a formation in which a deviated borehole is present, the method comprising:
    determining radial profiles of Stoneley, fast dipole shear, and slow dipole shear slownesses using first orthogonal axes defined by an azimuth of the deviated borehole from a North direction and a deviation of a longitudinal axis of the deviated borehole from a vertical direction;
    calculating dipole shear moduli C44" and C55" defined in the first orthogonal axes using the fast dipole shear slowness and the slow dipole shear slowness;
    calculating modulus C66" defined in the first orthogonal axes using the Stoneley slowness;
    estimating a set of stresses defined in the first orthogonal axes by performing an inversion that uses far-field shear moduli C44", C55", and C66" and radial profiles of dipole shear moduli C44" and C55" at two or more different radial positions; and
    transforming the set of stresses defined in the first orthogonal axes to maximum and minimum horizontal stresses defined in second orthogonal axes that are aligned with the North direction and the vertical direction.

2. The method of claim 1, wherein transforming the set of stresses defined in the first orthogonal axes to the maximum and minimum horizontal stresses defined in the second orthogonal axes comprises expressing the set of stresses as a function of (i) the deviated borehole azimuth from the North, (ii) the deviation of the longitudinal axis of the deviated borehole from the vertical, (iii) the formation maximum horizontal stress, (iv) minimum horizontal stress, and (v) overburden stress.

3. The method of claim 2, wherein transforming the set of stresses defined in the first orthogonal axes to the maximum and minimum horizontal stresses defined in the second orthogonal axes further comprises expressing radial profiles of Stoneley, fast dipole shear, and slow dipole shear slownesses as a function of the set of stresses and an acoustoelastic coefficient.

4. The method of claim 3, wherein the acoustoelastic coefficient comprises a non linear elastic stiffness parameter and a shear modulus of the formation.

5. The method of claim 4, wherein the acoustoelastic coefficient relates sonic or seismic velocities in the formation to corresponding changes in the set of stresses in the formation.

6. Apparatus for estimating stress in a formation in which a deviated borehole is present, the apparatus comprising:
    at least one acoustic sensor that provides radial profiles of Stoneley, fast dipole shear, and slow dipole shear slownesses using first orthogonal axes defined by an azimuth of the deviated borehole from a North direction and a deviation of a longitudinal axis of the deviated borehole from a vertical direction;
    processing circuitry that:
        (i) calculates dipole shear moduli C44" and C55" defined in the first orthogonal axes using the fast dipole shear slowness and the slow dipole shear slowness;
        (ii) calculates modulus C66" defined in the first orthogonal axes using the Stoneley slowness;
        (iii) estimates a set of stresses defined in the first orthogonal axes by performing an inversion that uses far-field shear moduli C44", C55", and C66" and radial profiles of dipole shear moduli C44" and C55" at two or more different radial positions; and
        (iv) transforms the set of stresses defined in the first orthogonal axes to maximum and minimum horizontal stresses defined in second orthogonal axes that are aligned with the North direction and the vertical direction.

7. The method of claim 1, wherein estimating the set of stresses defined in the first orthogonal axes by performing an inversion comprises inverting (i) difference equations obtained from far-field shear moduli C44", C55", and C66", (ii) difference equations obtained from radial profiles of dipole shear moduli C44" and C55" at two or more different radial positions, and (iii) a relationship between deviated borehole stresses within the formation proximate to the borehole and deviated borehole stresses in the far-field of the formation.

8. The apparatus of claim 6, wherein estimating the set of stresses defined in the first orthogonal axes by performing an inversion comprises inverting (i) difference equations obtained from far-field shear moduli C44", C55", and C66", (ii) difference equations obtained from radial profiles of dipole shear moduli C44" and C55" at two or more different radial positions, and (iii) a relationship between deviated borehole stresses within the formation proximate to the borehole and deviated borehole stresses in the far-field of the formation.

9. The method of claim 1, further comprising:
placing a logging tool within the deviated borehole;
transmitting acoustic waves into the formation using the logging tool; and
detecting the acoustic waves to acquire acoustic data using the logging tool;
wherein the radial profiles of Stoneley, fast dipole shear, and slow dipole shear slownesses are determined using the acoustic data.

10. Apparatus for estimating stress in a formation in which a deviated borehole is present, the apparatus comprising:
a logging tool configured to transmit acoustic waves into the formation from the deviated borehole and detect the acoustic waves to acquire acoustic data;
processing circuitry that:
(i) determines radial profiles of Stoneley, fast dipole shear, and slow dipole shear slownesses using:
(a) the acoustic data, and
(b) first orthogonal axes defined by an azimuth of the deviated borehole from a North direction and a deviation of a longitudinal axis of the deviated borehole from a vertical direction;
(ii) calculates dipole shear moduli C44" and C55" defined in the first orthogonal axes using the fast dipole shear slowness and the slow dipole shear slowness;
(iii) calculates modulus C66" defined in the first orthogonal axes using the Stoneley slowness;
(iv) estimates a set of stresses defined in the first orthogonal axes by performing an inversion that uses far-field shear moduli C44", C55", and C66" and radial profiles of dipole shear moduli C44" and C55" at two or more different radial positions; and
(v) transforms the set of stresses defined in the first orthogonal axes to maximum and minimum horizontal stresses defined in second orthogonal axes that are aligned with the North direction and the vertical direction.

11. The apparatus of claim 10, wherein estimating the set of stresses defined in the first orthogonal axes by performing an inversion comprises inverting (i) difference equations obtained from far-field shear moduli C44", C55", and C66", (ii) difference equations obtained from radial profiles of dipole shear moduli C44" and C55" at two or more different radial positions, and (iii) a relationship between deviated borehole stresses within the formation proximate to the borehole and deviated borehole stresses in the far-field of the formation.

* * * * *